(12) United States Patent
Agata et al.

(10) Patent No.: US 11,003,106 B2
(45) Date of Patent: May 11, 2021

(54) PROCESS CARTRIDGE AND IMAGE FORMING APPARATUS

(71) Applicant: CANON KABUSHIKI KAISHA, Tokyo (JP)

(72) Inventors: Shinichi Agata, Suntou-gun (JP); Shinichi Hagiwara, Tokyo (JP); Yoshihiro Mitsui, Numazu (JP); Kosuke Ikada, Machida (JP); Kentaro Yamawaki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/679,524

(22) Filed: Nov. 11, 2019

(65) Prior Publication Data

US 2020/0150553 A1     May 14, 2020

(30) Foreign Application Priority Data

Nov. 14, 2018   (JP) .............................. JP2018-213893

(51) Int. Cl.
*G03G 15/02* (2006.01)
*C08K 3/04* (2006.01)
(Continued)

(52) U.S. Cl.
CPC ........... *G03G 15/0233* (2013.01); *C08K 3/04* (2013.01); *G03G 9/0821* (2013.01);
(Continued)

(58) Field of Classification Search
CPC ............. G03G 15/0233; G03G 9/0821; G03G 9/0825; G03G 9/08773; G03G 9/09725
See application file for complete search history.

(56) References Cited

U.S. PATENT DOCUMENTS 6,697,587 B2    2/2004  Harada
2010/0075245 A1*  3/2010  Watanabe ............ G03G 9/0827
                                                              430/123.41
(Continued)

FOREIGN PATENT DOCUMENTS

EP        2666814 A1    11/2013
JP     2002003651 A     1/2002
(Continued)

OTHER PUBLICATIONS

Machine Translation of JP2017-138462. Aug. 10, 2017. (Year: 2017).*

(Continued)

*Primary Examiner* — Carla J Therrien
(74) *Attorney, Agent, or Firm* — Rossi, Kimms & McDowell LLP

(57) ABSTRACT

A charging member 2 that charges an image bearing member 1 has an electrically conductive support and an elastic layer in contact with the image bearing member 1. The elastic layer includes a semi-conductive rubber composition having a matrix-domain structure including a matrix and domains having electric conductivity. The matrix has a higher volume resistivity than the domain. The developer includes a toner having toner particles. The toner particles each have a surface layer including an organosilicon polymer. The organosilicon polymer has a structure represented by R—SiO$_{3/2}$ (R is a hydrocarbon group having at least 1 and not more than 6 carbon atoms). The adhesion ratio of the organosilicon polymer on the surface of the toner particle is 90% or more.

7 Claims, 7 Drawing Sheets

(51) Int. Cl.
     *G03G 9/08*    (2006.01)
     *G03G 9/087*   (2006.01)
     *G03G 9/097*   (2006.01)
     *G03G 21/00*   (2006.01)
     *G03G 21/18*   (2006.01)

(52) U.S. Cl.
     CPC ....... *G03G 9/0825* (2013.01); *G03G 9/08773* (2013.01); *G03G 9/09725* (2013.01); *G03G 21/0011* (2013.01); *G03G 21/1842* (2013.01); *G03G 2221/183* (2013.01)

(56) References Cited

U.S. PATENT DOCUMENTS

| | | | | |
|---|---|---|---|---|
| 2017/0102633 | A1* | 4/2017 | Yoshidome | G03G 21/1814 |
| 2017/0329246 | A1* | 11/2017 | Yamawaki | G03G 9/0821 |
| 2018/0329327 | A1* | 11/2018 | Yamawaki | G03G 9/08711 |

FOREIGN PATENT DOCUMENTS

| | | | |
|---|---|---|---|
| JP | 2003280255 | A | 10/2003 |
| JP | 2015022078 | A | 2/2015 |
| JP | 2015075662 | A | 4/2015 |
| JP | 2017138462 | A | 8/2017 |

OTHER PUBLICATIONS

Extended European Search Report issued in European Appln. No. 19208116.4 dated Apr. 29, 2020.

\* cited by examiner

PROCESS CARTRIDGE AND IMAGE FORMING APPARATUS

BACKGROUND OF THE INVENTION

Field of the Invention

The present invention relates to an electrophotographic image forming apparatus. Here, the electrophotographic image forming apparatus (hereinafter also simply referred to as "image forming apparatus") refers to an apparatus in which an image on a recording material (recording medium) is formed using an electrophotographic image forming system. Examples of the image forming apparatus include a copying machine, a printer (laser beam printer, LED printer, and the like), a facsimile machine, a word processor, and a multifunction machine (multifunction printer) thereof.

Description of the Related Art

In an electrophotographic image forming apparatus, the surface of an electrophotographic photosensitive member (hereinafter referred to as a photosensitive drum or drum) is uniformly charged by a primary charger, and the charged photosensitive drum surface is exposed by an exposure device to form an electrostatic latent image. The electrostatic latent image is developed by a developing device to form a developer image (hereinafter referred to as a toner image), and the toner image is transferred to a recording material such as a sheet by a transfer device. Thereafter, the toner image is fixed on the recording material as a fixed image by a fixing device and outputted. A toner remaining on the surface of the photosensitive drum after the toner image is transferred is cleaned by a cleaning device and provided for the next image forming operation.

The developing device, the photosensitive drum, and the cleaning device are sometimes integrally configured as a process cartridge that can be detachably attached to the image forming apparatus.

From the viewpoint of simplicity of configuration and toner removal capability, counter-type blade cleaning in which a cleaning blade configured of an elastic body is brought into contact in the counter direction with respect to the rotation direction of the photosensitive drum is widely used in a cleaning device. In the counter-type blade cleaning, the cleaning blade is strongly brought into contact with and rubbed against the photosensitive drum. For this reason, the driving torque of the photosensitive drum accounts for a larger part of the process cartridge driving torque.

Described hereinbelow are examples of torque reduction in blade cleaning aimed at the reduction of power consumption by reducing the driving torque of an image forming apparatus on which a process cartridge is mounted and the downsizing of the image forming apparatus and devices.

In Japanese Patent Application Laid-open No. 2015-22078, spherical silica and non-spherical silica are externally added to a toner and a lubricant such as a fatty acid metal salt is applied to a photosensitive drum, Here, in a low-temperature and low-humidity environment, a low torque is achieved due to the effect of the lubricant. In addition, since discharge products adhere to the lubricant resulting in a high torque in a high-temperature and high-humidity environment, the torque is reduced by interposing a spherical silica external additive between the leaning blade and the photosensitive drum (hereinafter referred to as a contact portion).

In Japanese Patent Application Laid-open No. 2003-280255, the free ratio of the external additive included in the toner is 1% or more, and the external additive is supplied to the cleaning member and is interposed in the contact portion in the same manner as in Japanese Patent Application Laid-open No. 2015-22078 to reduce the torque.

Further, in recent years, a contact charging system as a charging device has been installed in many image forming apparatuses and has become the mainstream of charging devices. In most of the contact charging systems, a conductive roller is used as a contact charging member, and roller charging is used in which a voltage is applied by bringing the conductive roller into contact with the photosensitive drum.

A conductive roller is known in which an elastic layer is formed using a conductive rubber composition of an electron conductive system into which conductive particles such as carbon black are blended in order to impart the elastic layer with a conductivity of about $1 \times 10^4$ $\Omega \cdot$cm to $1 \times 10^8$ $\Omega \cdot$cm terms of volume resistivity. However, the elastic layer formed in this way has a problem that the electric resistance thereof strongly depends on the dispersed state of the conductive particles, and the resistance unevenness in the roller is large. Further, the ease of transfer of the electric charge between the conductive particles due to the electric field effect varies depending on the applied voltage. Therefore, the voltage dependence of the electric resistance value is large.

In an ion conductive material, the moving speed of ions changes depending on the ambient temperature, humidity and the like. Therefore, the environmental dependency of the electric resistance value is large. Thus, both the electron conductive system and the ion conductive system have a problem in the stability of charging performance.

With respect to such a problem, Japanese Patent Application Laid-open No. 2002-003651 proposes the following semiconductive rubber composition as a semiconductive rubber composition in which the electric resistance value can be easily set and voltage dependency and environmental fluctuation are small, and also proposes a charging member using such a composition. That is, this semiconductive rubber composition has a matrix-domain structure (sea island structure) including a matrix made of an ion conductive rubber material and a domain made of an electron conductive rubber material. The surface (circumferential surface) of the elastic layer of the charging member is configured such that a plurality of electron conductive rubber material portions is scattered on the surface made of the ion conductive rubber material. The charging member of a sea-island structure composed of a single layer of this type is characterized in that dirt such as an external additive is likely to adhere selectively to the matrix portion having high resistance, but has little influence on the image.

Patent Literature 1: Japanese Patent Application Laid-open No. 2015-22078

Patent Literature 2: Japanese Patent Application Laid-open No. 2003-280255

Patent Literature 3: Japanese Patent Application Laid-open No. 2002-003651

SUMMARY OF THE INVENTION

However, the abovementioned prior art has the following problems. In Japanese Patent Application Laid-open No. 2015-22078 and Japanese Patent Application Laid-open No. 2003-280255, torque reduction is realized by interposing an external additive in the contact portion. This means that the external additive is gradually discharged to the downstream side of the cleaning blade, and in long-term use, streaky density changes may occur or unevenness may occur on the image due to contamination of the charging member.

In addition, in the charging member of a sea-island structure constituted by a single layer of Japanese Patent Application Laid-open No. 2002-003651, dirt such as an external additive is likely to adhere selectively to the matrix portion having high resistance. For this reason, where the contact pressure (penetration amount) of the cleaning blade is lowered to reduce the torque, a large amount of dirt such as external additives adheres to the matrix portion having high resistance, and there is a possibility that in long-term use, a problem such as the occurrence of a streak-like density change or the occurrence of unevenness on the image due to contamination of the charging member may occur.

Another possible problem is that a groove extending in the substantially circumferential direction may be formed as a drum scratch on the circumferential surface of the photosensitive drum due to the adhesion of dirt such a an external additive.

An object of the present invention is to provide a process cartridge and an image forming apparatus that suppress the occurrence of charging member contamination while reducing the driving torque of an image bearing member.

Another object is to provide a process cartridge and an image forming apparatus that suppress scratches on the image bearing member.

The present invention provides a process cartridge for use in an image forming apparatus, comprising:

an image bearing member configured to bear a developer image formed by developing an electrostatic latent image with a developer;

a charging member configured to contact the image bearing member and charge the image bearing member; and a cleaning member configured to contact a surface of the image bearing member and clean the surface, wherein the charging member having an electrically conductive support and an elastic layer in which is positioned in contact with the image bearing member;

the elastic layer including a semi-conductive rubber composition having a matrix-domain structure including a matrix and domains having electric conductivity;

the matrix has a higher volume resistivity than the domain;

a developer including a toner having toner particles;

the toner particles each have a surface layer including an organosilicon polymer;

the organosilicon polymer has a structure represented by a following formula:

$$R\text{—}SiO_{3/2}$$

wherein R represents a hydrocarbon group having at least 1 and not more than 6 carbon atoms; and wherein the adhesion ratio of the organosilicon polymer on the surface of each of the toner particles is 90% or more.

The present invention also provides an image forming apparatus comprising:

an apparatus main body; and
the process cartridge that is detachably attachable to the apparatus main body.

According to the present invention, it is possible to suppress the charging member contamination while reducing the driving torque of the image bearing member. Further, it is possible to suppress scratches on the image bearing member.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

In the present invention, the expression of "at least AA and not more than BB" or "AA to BB" representing a numerical range means a numerical range including lower limit and an upper limit as end points unless otherwise specified.

Hereinafter, exemplary embodiments or examples of the present invention will be described in detail with reference to the drawings. However, since the dimensions, materials, shapes, relative positions, etc. of the components described in the embodiment or examples are appropriately changed depending on the configuration of the apparatus to which the invention is applied and various conditions, the scope of the intention is not intended to be limited thereby, unless specifically stated otherwise.

Unless clearly indicated otherwise, "parts" means "parts by mass", and commercially available high-purity products were used unless indicated otherwise.

Embodiment 1

Image Forming Apparatus

Figure 1:
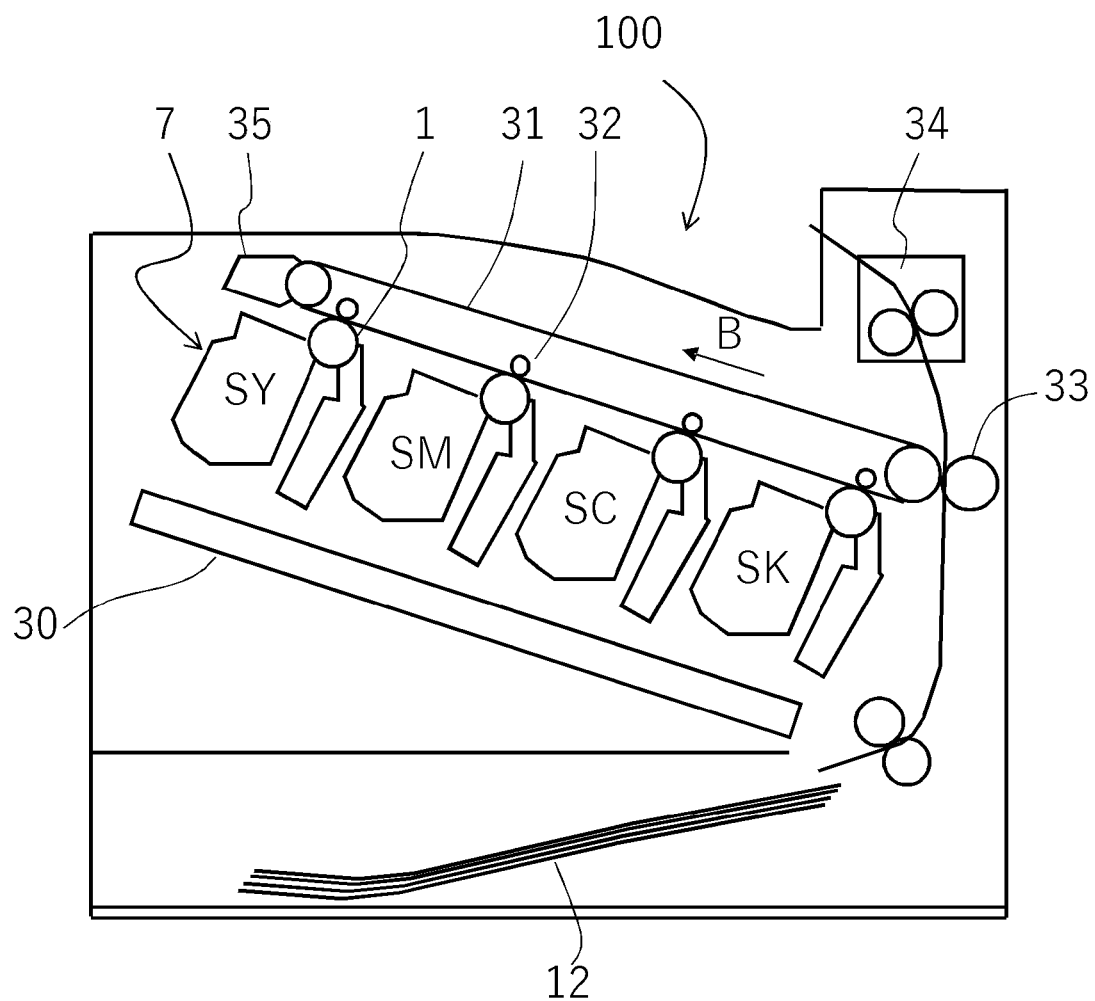
FIG. 1 is a schematic sectional view of an image forming apparatus according to an embodiment of the present invention.

The overall configuration of an embodiment of one electrophotographic image forming apparatus will be described with reference to FIG. 1. FIG. 1 is a schematic cross-sectional view of an image forming apparatus 100 according to an embodiment of the present invention. Examples of the image forming apparatus to which the present invention can be applied include a copying machine, a printer and the like using an electrophotographic system. In the case described herein, the present invention is applied to a full color laser beam printer using a tandem system and an intermediate transfer system as the image forming apparatus 100 of the present embodiment.

The image forming apparatus 100 can form a full-color image on a recording material (for example, recording paper, plastic sheet, cloth, and the like) according to image information. The image information is inputted to the image forming apparatus main body from an image reading device connected to the image forming apparatus main body or a host device such as a person computer communicably connected to the age forming apparatus main body.

In the image forming apparatus 100, process cartridges 7 as a plurality of image forming units have first to fourth forming units SY, SM, SC, SK for forming yellow (Y), magenta (M), cyan (C), and black (K) images, respectively. In the present embodiment, the image forming units SY, SM, SC, and SK are arranged in a row in a direction that intersects the vertical direction.

Further, in the present embodiment, the configurations and operations of the first to fourth image forming units SY, SM, SC, SK are substantially the same except that the colors of images to be formed are different. Therefore, in the following general explanation, the symbols Y, M, C, K given to the reference numerals to indicate that they are elements provided for a certain color are omitted, unless there is a particular distinction.

The process cartridge 7 can be attached to and detached from the image forming apparatus 100 by using mounting means such as a mounting guide and a positioning member provided at the image forming apparatus main body. In the present embodiment, the process cartridges 7 for the respective colors all have the same shape, and the process cartridge 7 for each color accommodates a toner (developer) of respective color: yellow (Y), magenta (M), cyan (C), and black (K). In the present embodiment, a configuration in which the process cartridge can be detachably attached to the apparatus main body will be described. However, a developing device 3 alone may be configured to be detachably attachable to the image forming apparatus main body.

A photosensitive drum 1 as an image bearing member that bears an electrostatic image (electrostatic latent image) is rotationally driven by a driving means (drive source) not shown in the figure. The image forming apparatus 100 is provided with a scanner unit (exposure device) 30. The scanner unit 30 is an exposure means for emitting a laser beam on the basis of image information to form an electrostatic image (electrostatic image) on the photosensitive drum 1. Further, in the image forming apparatus 100, an intermediate transfer belt 31 as an intermediate transfer body for transferring the toner image on the photosensitive drum 1 to a recording material 12 is disposed so as to face the four photosensitive drums 1.

The intermediate transfer belt 31 formed of an endless belt as an intermediate transfer member is in contact with all the photosensitive drums 1 and circulates (rotates) in the direction indicated by an arrow B (counterclockwise) in the figure.

On the inner circumferential surface side of the intermediate transfer belt 31, four primary transfer rollers 32 serving as primary transfer means are arranged side in side so as to face the respective photosensitive drums 1. A voltage having a polarity opposite to the normal charging polarity of the toner is applied to the primary transfer roller 32 from a primary transfer bias power source (high-voltage power source) as a primary transfer bias applying means (not shown). As a result, the toner image on the photosensitive drum 1 is transferred (primary transfer) onto the intermediate transfer belt 31.

Further, a secondary transfer roller 33 as a secondary transfer unit is disposed on the outer circumferential surface side of the intermediate transfer belt 31. A voltage having a polarity opposite to the normal charging polarity of the toner is applied to the secondary transfer roller 33 from a secondary transfer bias power source (high-voltage power source) as a secondary transfer bias applying means (not shown). As a result, the toner image on the intermediate transfer belt 31 is transferred (secondary transfer) to the recording material 12. For example, when forming a full-color image, the above-described process is sequentially performed in the image forming units SY, SM, SK, and the toner images of respective colors are sequentially superimposed and primarily transferred onto the intermediate transfer belt 31. Thereafter, the recording material 12 is conveyed to the secondary transfer portion in synchronization with the movement of the intermediate transfer belt 31. The four-color toner image on the intermediate transfer belt 31 is secondarily transferred as a whole onto the recording material 12 by the action of the secondary transfer roller 33 which is in contact with the intermediate transfer belt 31 with the recording as material 1 being interposed therebetween.

The recording material 12 to which the toner image has been transferred is conveyed to a fixing device 34 as a fixing means. The toner image is fixed on the recording material 12 by applying heat and pressure to the recording material 12 in the fixing device 34.

Process Cartridge

The overall configuration of the process cartridge 7 mounted on the image forming apparatus of the present embodiment will be described hereinbelow.

Figure 2:
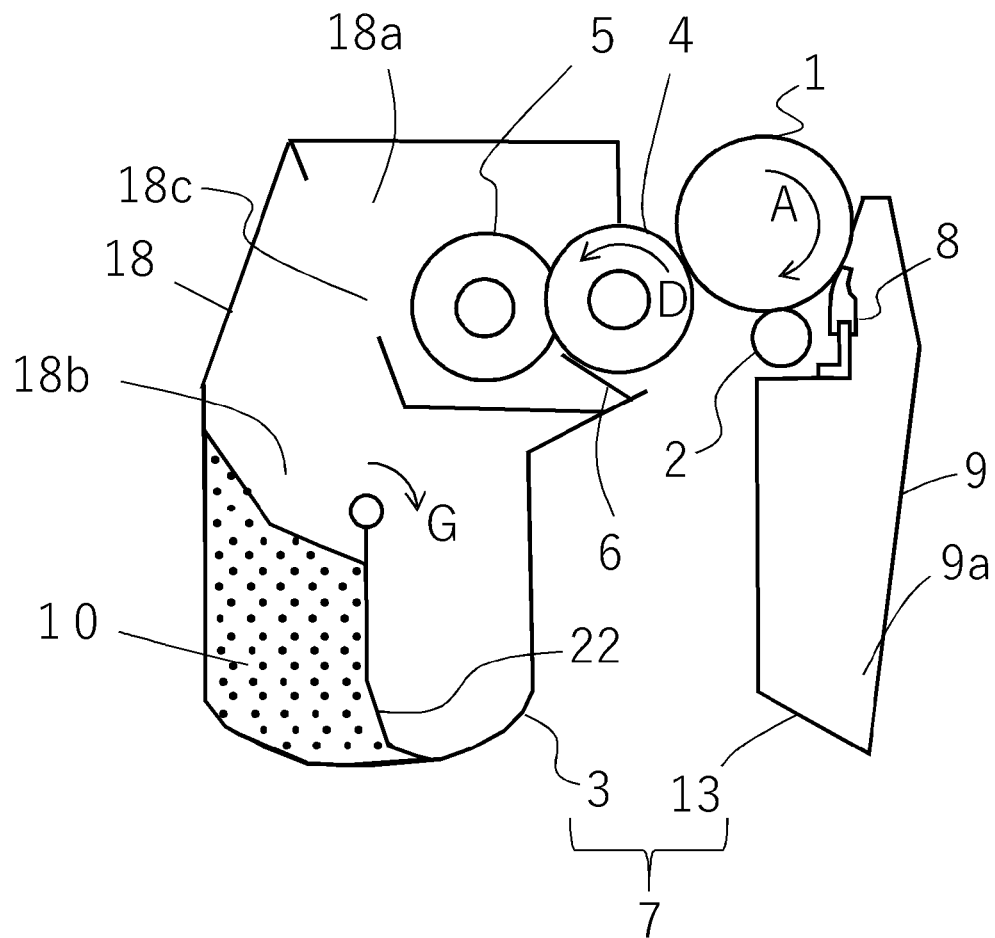
FIG. 2 is a schematic sectional view of the process cartridge according to the embodiment of the present invention.

FIG. 2 is a cross-sectional view (main cross-sectional view) of the process cartridge 7 of the present embodiment taken along the longitudinal direction (rotational axis direction) of the photosensitive drum 1. In the present embodiment, the configuration and operation of the process cartridge 7 for each color are substantially the same except for the type (color) of the developer stored therein. Each operation in the present embodiment is controlled by a control unit (control means) of a CPU (not shown).

The posture of the process cartridge 7 in FIG. 2 is a posture in which the process cartridge 7 is mounted on the image forming apparatus main body (during use). In this description, when the positional relationship and direction of each member of the process cartridge are described, the positional relationship and direction in this posture are indicated. That is, the up-down direction in FIG. 2 corresponds to the gravity direction (vertical direction), and the left-right direction corresponds to the horizontal direction. The arrangement configuration is set on the assumption that the image forming apparatus is installed on a horizontal plane in a normal installation state.

The process cartridge 7 includes a developing unit 3 including a developing roller 4 or the like as a developing means and a photosensitive member unit 13 including the photosensitive drum 1 or the like.

The developing unit 3 includes the developing roller 4, a toner supply roller 5, a toner conveying member 22, and a developing frame 18 that rotatably supports them. The developing frame 18 includes a development chamber 18a in which the developing roller 4 and the toner supply roller 5 are disposed and a developer storage chamber 18b in which the toner 10 is stored. The development chamber 18a and the developer storage chamber 18b communicate with each other through an opening 18c. The developer storage chamber 18b is disposed below the development chamber 18a. In the developer storage chamber 18b, the toner 10 serving as a developer is stored. In the present embodiment, the normal charging polarity of the toner 10 is negative. Here, the normal charging polarity is a charging polarity for developing an electrostatic image. In the present embodiment, since the negative electrostatic image is reversely developed, the normal charging polarity of the toner is negative. However, the present invention is not limited to the negatively chargeable toner.

The developer storage chamber 18b is provided with the toner conveying member 22 for conveying the toner 10 to the development chamber 18a. As the toner conveying member rotates in the direction of arrow G in the figure, the toner 10 is conveyed to the development chamber 18a.

The development chamber 18a is provided with the developing roller 4 as a developer bearing member that contacts the photosensitive drum 1 and rotates in the direction of the arrow D shown in the drawing. In the present embodiment, the developing roller 4 and the photosensitive drum 1 rotate so that their surfaces move in the same direction at the facing portion, that is, so that the rotation directions thereof are opposite to each other. A voltage sufficient to develop and visualize the electrostatic image on the photosensitive drum 1 as a toner image is applied to the developing roller 4 from a first power supply (high-voltage power supply) (not show serving as a first voltage applying means.

Further, a toner supply roller (hereinafter simply referred to as "supply roller") 5 as a developer supply member that supplies the toner 10 conveyed from the toner storage chamber 18b to the developing roller 4 is disposed inside the development chamber 18a. Disposed therein is also a developer amount regulating member (hereinafter simply referred to as "regulating member") 6 that regulates the coat amount of the toner on the developing roller 4 supplied by the supply roller 5 and performs charge application.

The supply roller 5 is an elastic sponge roller having a conductive mandrel and a foam layer on the surface. The supply roller 5 is disposed to form a contact portion between the supply roller and the developing roller 4, and rotates in the direction of the arrow E in the drawing. However, the rotation direction of the supply roller may be opposite to E.

Further, a voltage is applied to the supply roller 5 from a second power source (high-voltage power source) (not shown) as a second voltage applying means.

The toner 10 supplied to the developing roller 4 by the supply roller 5 enters the contact portion between the regulating member 6 and the developing roller 4 as a result of rotation of the developing roller 4 in the arrow D direction. The toner 10 is triboelectrically charged and imparted with an electric charge by rubbing between the developing roller 4 and the regulating member 6, and at the same time, the toner layer thickness is regulated. The regulated toner 10 on the developing roller 4 is conveyed to a portion facing the photosensitive drum 1 by the rotation of the developing roller 4, and the electrostatic image on the photosensitive drum 1 is developed and visualized as a toner image.

Meanwhile, the photosensitive member unit 13 includes a cleaning frame 9 as a frame that supports various components of the photosensitive member unit 13 such as the photosensitive drum 1. The photosensitive drum 1 is rotatably attached to the cleaning frame 9 through a bearing (not shown). The photosensitive drum 1 is an organic photosensitive member drum and has an outer diameter of 24 mm. By receiving the driving force of a driving motor P (not shown) as drum driving means, the drum rotated in the direction of arrow A in the drawing.

Further, the charging roller 2 and a cleaning blade 8 as a cleaning member are disposed in the photosensitive member unit 13 so as to come into contact with the circumferential surface of the photosensitive drum 1. The charging roller 2 is urged in a direction toward the photosensitive drum 1 by a spring (not shown) as an urging mean and is driven to rotate as the photosensitive drum 1 rotates.

The cleaning blade 8 slides and rubs the photosensitive drum 1 at a relative speed equal to the surface speed of the photosensitive drum 1 by the rotation of the photosensitive drum 1, scrapes off the toner 10 remaining in the transfer process, and prevents contamination of the charging roller 2 as a charging member by residual toner, external additives and the like. Further, discharge products adhering to the surface of the photosensitive drum 1 in the charging step are removed to prevent an increase in friction of the photosensitive drum 1.

The toner scraped off by the cleaning blade 8 is stored in a recovery chamber 9a. A configuration may be adopted in which the toner is stored in a toner recovery container provided in the image forming apparatus through the toner recovery chamber 9a.

Hereinafter, details of the toner and the cleaning blade according to the present invention will be described.

Toner

The developer includes a toner having a toner particle, the toner particle has a surface layer including an organosilicon polymer, and the organosilicon polymer has a structure represented by a following formula (1).

Further, the adhesion ratio of the organosilicon polymer on the surface of the toner particle is 90% or more.

$$R\text{---}SiO_{3/2} \qquad \text{Formula (1)}$$

(R represents a hydrocarbon group having at least 1 and not more than 6 carbon atoms.)

The adhesion ratio of the organosilicon polymer on the surface of the toner particle is preferably at least 90% and not more than 100%, and more preferably at least 95% and not more than 100%. A method for measuring the adhesion ratio of the organosilicon polymer on the surface of the loner particle will be described later.

When the adhesion ratio of the organosilicon polymer is less than 90%, the organosilicon polymer peeled off from the toner particle when a large number of prints are outputted adheres to and stays in a portion where the conductivity of the charging member is small, which results in image defects.

In order to obtain the aforementioned adhesion ratio, a surface layer including the organosilicon polymer having a structure represented by the formula (1) may be formed on the toner particle.

Further, the adhesion ratio of the organosilicon polymer can be controlled by the type and amount of the organosilicon compound used for forming the organosilicon polymer, the production method of the toner particle at the time of forming the organosilicon polymer, reaction temperature, reaction time, reaction solvent and pH.

Further, the toner preferably has a Martens hardness of at least 200 MPa and not more than 1100 MPa, and more preferably at least 500 MPa and not more than 1100 MPa when measured under the condition of a maximum load of $2\times10^{-4}$ N.

When the Martens hardness is within the above range, the toner particle is unlikely to deform and acts as a spacer when sandwiched between the cleaning member and the image bearing member. Also the contact area is reduced and the driving torque of the image bearing member is further reduced. Further, the image bearing member is not damaged when the toner particle is sandwiched between the cleaning member and the image bearing member.

Method for Measuring Martens Hardness of Toner

Hardness is one of the mechanical properties at or near the surface of an object. Hardness represents resistance of the object to deformation and scratching when the object is about to be deformed or scratched by foreign matter. Various measurement methods and definitions are known for hardness. For example, the appropriate measurement method is used according to the size of the measurement region. When the measurement region is 10 µm or more, the Vickers method is often used, when the measurement region is 10 µm or less, the nanoindentation method is used, and when the measurement region is 1 µm or less, AFM or the like is used. Regarding the definitions, Brinell hardness and Vickers hardness are used as indentation hardness, Martens hardness is used as scratch hardness, and Shore hardness is used as rebound hardness.

In the measurement of toner, since the general particle diameter is at least 3 µm and not more than 10 µm, the nanoindentation method is preferably used. According to the study conducted by the inventors, Martens hardness representing scratch hardness is appropriate to specify hardness. This is thought to be so because the scratch hardness represents the resistance of the toner to scratching by a hard substance such as a metal or an external additive in the developing machine.

With the method for measuring the Martens hardness of the toner by the nanoindentation method, the hardness can be calculated from a load-displacement curve obtained in accordance with the procedure of the indentation test stipulated by ISO14577-1 in a commercially available apparatus conforming to ISO14577-1. In the present invention, an ultra-fine indentation hardness tester "ENT-1100b" (manufactured by Elionix Inc.) was used as an apparatus conforming to the ISO standard. The measurement method is described in the "ENT1100 operation manual" provided with the apparatus. The specific measurement method is as follows.

The measurement environment was maintained at 30.0° C. inside a shield case with a provided temperature control device. Keeping the ambient temperature constant is effective in terms of reducing variations in measurement data due to thermal expansion and drift. The set temperature was 30.0° C., assuming a temperature in the vicinity of the developing machine where the toner was rubbed. The sample stage used was a standard sample stage provided with the apparatus. After applying the toner, weak air flow was blown so that the toner was dispersed, and the sample stage was set on the apparatus and held for 1 h or more, and then the measurement was performed.

The measurement was performed using a flat indenter (titanium indenter, tip is made of diamond) having a 20 µm square tip and provided with the apparatus. A flat indenter was used because where a sharp indenter is used with respect to a small-diameter and spherical object, an object to which an external additive is attached, or an object having irregularities on the surface, such as a toner, the measurement accuracy is greatly affected. The maximum load of the test is set to $2.0 \times 10^{-4}$ N. By setting this test load, it is possible to measure the hardness without fracturing the surface layer of the toner under the condition corresponding to the stress applied to one toner particle in the developing unit. In the present invention, the hardness is measured while maintaining the surface layer without fracture from the viewpoint of friction resistance.

The particle to be measured is selected such that the toner alone is present on the measurement screen (field size: 160 µm width, 120 µm length) of a microscope provided with the apparatus. However, in order to eliminate the displacement error as much as possible, a particle having a particle diameter (D) in the range of ±0.5 µm of the number average particle diameter (D1) (D1−0.5 µm≤D≤D1+0.5 µm) is selected. The particle diameter of the particles to be measured was measured by measuring the major axis and minor axis of the toner using software provided with the apparatus, and taking [(major axis+minor axis)/2] as the particle diameter D (µm). The number average particle diameter is measured by using "Coulter Counter Multisizer 3" (manufactured by Beckman Coulter, Inc.) by a method described hereinbelow.

Measurement of Particle Diameter of Toner (Particle)

A precision particle size distribution measuring apparatus (trade name: Coulter Counter Multisizer 3) based on a pore electric resistance method and dedicated software (trade name: Beckman Coulter Multisizer 3, Version 3.51, manufactured by Beckman Coulter, Inc.) were used. The aperture diameter was 100 µm, the number of effective measurement channels was 25,000, and the measurement data were analyzed and calculated. The electrolytic aqueous solution used for the measurement was ISOTON II (trade name) manufactured by Beckman Coulter, which was prepared by dissolving special grade sodium chloride in ion exchanged water so as to have a concentration of about 1% by mass. Prior to measurement and analysis, the dedicated software was set as follows.

In the "CHANGE STANDARD MEASUREMENT METHOD (SORT) SCREEN" of the dedicated software, the total count number in the control mode was set to 50,000 particles, the number of measurements was set to 1, and a value obtained using "standard particles 10.0 µm" (manufactured by Beckman Coulter, Inc.) was set as a Kd value. The threshold and the noise level were automatically set by pressing a measurement button of threshold/noise level. Further, the current was set to 1600 µA, the gain was set to 2, the electrolytic solution was set to ISOTON II (trade name), and, flush of aperture tube after measurement were checked.

In the "PULSE TO PARTICLE DIAMETER CONVERSION SETTING SCREEN" of the dedicated software, the bin interval was set to a logarithmic particle diameter, the particle diameter bin was set to a 256-particle diameter bin, and a particle diameter range was set at least 2 µm and not more than 60 µm.

The specific measurement method is described hereinbelow.

(1) Approximately 200 mL of the electrolytic aqueous solution was placed in a glass 250 mL round-bottom beaker dedicated to Multisizer 3, the beaker was set in a sample stand, and stirring with a stirrer rod was carried out counterclockwise at 24 revolutions per second. Dirt and air bubbles in the aperture tube were removed by the "FLUSH OF APERTURE TUBE" function of the dedicated software.

(2) About 30 mL of the electrolytic aqueous solutions vas placed in a glass 100 mL flat-bottom beaker. Then, about 0.3 mL of a diluted solution obtained by fold mass dilution of "CONTAMINON N" (trade name) (10% by mass aqueous solution of a neutral detergent for washing precision measuring instruments, manufactured by Wako Pure Chemical. Industries Ltd.) with ion exchanged water was added.

(3) A predetermined amount of ion exchanged water and about 2 mL of the CONTAMINON N (trade name) were added to a water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees.

(4) The beaker of (2) hereinabove was set in the beaker fixing hole of the ultrasonic disperser, and the ultrasonic disperser was actuated. Then, the height position of the beaker was adjusted so that the resonance state of the liquid surface of the electrolytic aqueous solution in the beaker was maximized.

(5) About 10 mg of the toner was added little by little to the electrolytic aqueous solution and dispersed therein in a state in which the electrolytic aqueous solution in the beaker of (4) hereinabove was irradiated with ultrasonic waves. Then, the ultrasonic dispersion process was further continued for 60 sec. In the ultrasonic dispersion, the water temperature in the water tank was appropriately adjusted to a temperature at least 10° C. and not more than 40° C.

(6) The electrolytic aqueous solution of (5) hereinabove in which the toner was dispersed was dropped using a pipette into the round bottom beaker of (1) hereinabove which was set in the sample stand, and the measurement concentration was adjusted to be about 5%. Then, measurement was conducted until the number of particles to be measured reached 50,000.

(7) The measurement data were analyzed with the dedicated software provided with the apparatus, and the weight average particle diameter (D4) was calculated. The "AVERAGE DIAMETER" on the analysis/volume statistical value (arithmetic mean) screen when the dedicated software is set to graph/volume % is the weight average particle diameter (D4). The "AVERAGE DIAMETER" on the analysis/number statistical value (arithmetic mean) screen when the dedicated software is set to graph/number % is the number average particle diameter (D1).

The measurement is performed by selecting at random 100 toner particles having the particle diameter D (μm) satisfying the above conditions. The conditions inputted at the time of measurement are as follows.
Test mode: loading-unloading test
Test load: $2.0 \times 10^{-4}$ N
Number of divisions: 1000 steps
Step interval: 10 msec Where the measurement is performed by selecting "Data Analysis (ISO)" from the analysis menu, the Martens hardness is analyzed with the software, which is provided with the apparatus, after the measurement and outputted. The above measurement was performed on 100 toner particles, and the arithmetic average value was taken as the Martens hardness in the present invention.

In addition, a means for adjusting the Martens hardness, when measuring under the condition of the maximum load of $2.0 \times 10^{-4}$ N, to the range at least 200 MPa and not more than 1100 MPa is not particularly limited. However, since the hardness is significantly higher than the hardness of organic resins used in general toners, the required level is difficult to achieve with a means usually used to increase the hardness. For example, the required level is difficult to achieve by designing a resin with a high glass transition temperature, increasing the resin molecular weight performing thermosetting, adding a filler to the surface layer, and the like.

The Martens hardness of an organic resin used for a general toner is about at least 50 MPa and not more than 80 MPa when measured under a maximum load of $2.0 \times 10^{-4}$ N. Furthermore, even when the hardness is increased by resin design or by increasing the molecular weight, the hardness is about 120 MPa or less. Further, even when a filler such as a magnetic substance or silica is filled in the vicinity of the surface layer followed by thermal curing, the hardness is about 180 MPa or less. Thus, the toner of the present invention is significantly harder than a general toner.

Hardness Control Method

As one means for adjusting to the abovementioned specific hardness range, for example, the surface layer of the toner is formed of a substance such as an inorganic substance having an appropriate hardness, and then the chemical structure and the macro structure thereof are controlled to obtain an appropriate hardness.

As a specific example, an organosilicon polymer can be mentioned as a substance having such specific hardness, and the hardness thereof can be adjusted by the number of carbon atoms directly bonded to the silicon atom, the carbon chain length, and the like of the organosilicon polymer as a material selection.

It is preferable that the toner particle have a surface layer including an organosilicon polymer, and the average number of carbon atoms directly bonded to a silicon atom of the organosilicon polymer be at least 1 and not more than 3 per one silicon atom (preferably at least 1 and not more than 2 and more preferably 1) because the hardness is easy to adjust to a specific value.

As a means for adjusting the Martens hardness by the chemical structure, it is possible to adjust the chemical structure such as the crosslinking of the surface layer material and the degree of polymerization. As a means for adjusting the Martens hardness by the macro structure, it is possible to adjust the surface layer unevenness and the network structure connecting the protrusions. When an organosilicon polymer is used as a surface layer, these adjustments can be made by adjusting the pH, concentration, temperature, time, and the like when pretreating the organosilicon polymer. Further, the adjustment can be performed by the timing, form, concentration, reaction temperature, and the like of the surface coating of the organosilicon polymer on the core particle of the toner.

In the present embodiment, the following method is particularly preferable. First, core particles of toner particles are manufactured and dispersed in an aqueous medium to obtain a core particle-dispersed solution. Regarding the concentration at this time, it is preferable that the dispersion be performed at a concentration such that the solid fraction of the core particles is at least 10% by mass and not more than 40% by mass with respect to the total amount of the core particle-dispersed solution. The temperature of the core particle-dispersed solution is preferably adjusted to 35° C. or higher. The pH of the core particle-dispersed solution is preferably adjusted to a pH at which the condensation of the organosilicon compound is unlikely to proceed. Since the pH at which the condensation of the organosilicon polymer is unlikely to proceed differs depending on the substance, it is preferably within ±0.5, centering on the pH at which the reaction is most difficult to proceed.

Meanwhile, it is preferable to use an organosilicon compound subjected to hydrolysis. For example, hydrolysis in a separate container is performed as a pretreatment of the organosilicon compound. The finish concentration of hydrolysis is preferably at least 40 parts by mass and not more than 500 parts by mass, and more preferably at least 100 parts by mass and not more than 400 parts by mass of water from which ions have been removed, such as ion exchanged water or RO water, when the amount of the organosilicon compound is 100 parts by mass. The hydrolysis conditions are preferably a pH of 2 to 7, a temperature of 15° C. to 80° C., and a time of 30 min to 600 min.

By mixing the obtained hydrolysate and the core particle-dispersed solution and adjusting the pH to be suitable for condensation (preferably 6 to 1 or 1 to 3, and more preferably 8 to 12), the organosilicon compound can be coated on the core particle of the toner particle while being condensed. The condensation and surface layer formation are preferably performed at 35° C. or higher for 60 min or longer. In addition, the macro structure of the surface can be adjusted by adjusting the holding time at 35° C. or higher before adjusting to a pH suitable for condensation, but in order to easily obtain a specific Martens hardness, the holding time of at least 3 min and not more than 120 min is preferable.

By the means as described above, the amount of the reaction residue can be reduced, unevenness can be formed on the surface layer, and a network structure can be formed between the projections. Therefore, a toner having the specific Martens hardness can be easily obtained.

Surface Layer Including Organosilicon Polymer

As described above, the toner particle has a surface layer including an organosilicon polymer, and the organosilicon polymer has a structure represented by the following formula (1).

R—SiO$_{3/2}$          Formula (1)

(R represents a hydrocarbon group having at least 1 and not more than 6 carbon atoms.)

In the organosilicon polymer having the structure of the formula (1), one of the four valences of Si atoms is bonded to R, and the remaining three are bonded to O atoms. The O atoms constitute a state in which two valences are both bonded to Si, that is, a siloxane bond (Si—O—Si). Considering Si atoms and O atoms of the organosilicon polymer, since there are three O atoms for two Si atoms, the representation is by —SiO$_{3/2}$. It is conceivable that the —SiO$_{3/2}$ structure of the organosilicon polymer has properties similar to silica (SiO$_2$) composed of a large number of siloxane bonds. Therefore, it is conceivable that the Martens hardness can be increased because of the structure which is closer to the inorganic substance as compared to the toner in which the surface layer is formed by the conventional organic resin.

In the structure represented by the formula (1), R is preferably a hydrocarbon group having at least 1 and not more than 6 carbon atoms. As a result, the charge amount is likely to be stable. In particular, an aliphatic hydrocarbon group having at least 1 and not more than 5 carbon atoms, or a phenyl group which is excellent in environmental stability is preferable.

In addition, it is more preferable that R be a hydrocarbon group having at least 1 and not more than 3 carbon atoms for further improving the charging performance. When the charging performance is good, the transfer property is good and the amount of residual toner is small, so that the contamination of the drum, the charging member and the transfer member is reduced.

Preferred examples of the hydrocarbon group having at least 1 and not more than 3 carbon atoms include a methyl group, an ethyl group, a propyl group, and a vinyl group. From the viewpoints of environmental stability and storage stability, R is more preferably a methyl group, As a production example of the organosilicon polymer, a sol-gel method is preferable. The sol-gel method is a method in which a liquid raw material is used as a starting material for hydrolysis and condensation polymerization, and gelation is performed through a sol state. This method is used for synthesizing glass, ceramics, organic-inorganic hybrids, and nanocomposites. By using this production method, functional materials having various shapes such as surface layers, fibers, bulk bodies, and fine particles can be produced from a liquid phase at a low temperature.

Specifically, the organosilicon polymer present in the surface layer of the toner particle is preferably produced by hydrolysis and polycondensation of a silicon compound typified by an alkoxysilane.

By providing the toner panicle with a surface layer including this organosilicon polymer, environmental stability is improved, the toner performance is less likely to deteriorate during long-term use, and a toner having excellent storage stability can be obtained.

Furthermore, since the sol-gel method starts with a liquid and forms a material by gelling the liquid, various fine structures and shapes can be created. In particular, where the toner particle is produced in an aqueous medium, precipitation on the surface of the toner particle is facilitated due to the hydrophilicity created by a hydrophilic group such as a silanol group of the organosilicon compound. The fine structure and shape can be adjusted by the reaction temperature, reaction time, reaction solvent, pH, type and amount of the organometallic compound, and the like.

The organosilicon polymer of the surface layer of the toner particle is preferably a polycondensation product of an organosilicon compound having a structure represented by a following formula (Z).

[Chem. 1]

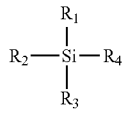

(Z)

(In the formula (Z), R$_1$ represents a hydrocarbon group having at least 1 and not more than 6 carbon atoms, and R$_2$, R$_3$, and R$_4$ each independently represent a halogen atom, a hydroxy group, an acetoxy group, or an alkoxy group.)

The hydrophobicity can be improved by the hydrocarbon group (preferably an alkyl group) of R$_1$, and a toner particle having excellent environmental stability can be obtained. Further, an aryl group, which is an aromatic hydrocarbon group, such as a phenyl group, can also be used as the hydrocarbon group. Since charge quantity fluctuation in various environments tends to increase when the hydrophobicity of R$_1$ is large, in view of environmental stability, R$_1$ is preferably a hydrocarbon group having at least 1 and not more than 3 carbon atoms, and more preferably a methyl group.

R$_2$, R$_3$, and R$_4$ are each independently a halogen atom, a hydroxy group, an acetoxy group, or an alkoxy group (hereinafter also referred to as a reactive group). These reactive groups are hydrolyzed, addition-polymerized and condensation-polymerized to form a crosslinked structure, and a toner having excellent resistance to member contamination and development durability can be obtained. The hydrolyzation ability is moderate at room temperature, and from the viewpoint of precipitation on the surface of toner particle and coverage, an alkoxy group having at least 1 and not more than 3 carbon atoms is preferable, and a methoxy group or an ethoxy group is more preferable. The hydrolysis, addition polymerization and condensation polymerization of $R_2$, $R_3$, and $R_4$ can be controlled by the reaction temperature, reaction time, reaction solvent and pH.

In order to obtain the organosilicon polymer used in the present embodiment, organosilicon compounds having three reactive groups ($R_2$, $R_3$, and $R_4$) in one molecule excluding $R_1$ in the formula (Z) shown above (hereinafter, referred to as trifunctional silane) may be used alone or in combination.

Further, the amount of the organosilicon polymer in the toner particle is preferably at least 0.5% by mass and not more than 10.5% by mass.

Where the amount of the organosilicon polymer is 0.5% by mass or more, the surface free energy of the surface layer can be further reduced, the flowability is improved, and the occurrence of member contamination or fogging can be suppressed. Where the amount is 10.5 mass % or less, it is possible to make it difficult for charge-up to occur. The amount of the organosilicon polymer is controlled by the type and amount of the organosilicon compound used for forming the organosilicon polymer, the method for producing the toner particle at the time of forming the organosilicon polymer, the reaction temperature, reaction time, reaction solvent and pH.

The surface layer including the organosilicon polymer and the toner core particle are preferably in contact with each other without any gap. As a result, the occurrence of bleeding of the resin component and the release agent located on the inner side of the toner particle with respect to the surface layer can be suppressed, and a toner having excellent storage stability, environmental stability, and development durability can be obtained. In addition to the above organosilicon polymer, the surface layer may include (resin such as a styrene-acrylic copolymer resin, a polyester resin, an urethane resin, various additives, and the like.

Method for Preparing THF-Insoluble Fraction of Toner Particle for NMR Measurement The tetrahydrofuran (THF)-insoluble fraction of toner particles was prepared in this following manner.

A total of 10.0 g of toner particles were weighed and put into a cylindrical filter paper (No. 86R manufactured by Toyo Filter Paper K.K.) and put on a Soxhlet extractor. Extraction was carried out for 20 h using 200 mL of THF as a solvent, and the residue obtained by vacuum drying the filtrate in the cylindrical filter paper at 40° C. for several hours was taken as the THF-insoluble fraction of the toner particles for NMR measurement.

Where the surface of the toner particle is treated with an external additive or the like, the external additive is removed by the following method to obtain a toner particle.

A total of 160 g of sucrose (manufactured by Kishida Chemical Co., Ltd.) is added to 100 mL of ion exchanged water and dissolved while forming a hot water bath to prepare a concentrated sucrose solution. Then, 31 g of the concentrated sucrose solution and 6 mL of CONTAMINON N (10% by mass aqueous solution of a neutral detergent for washing precision measuring instruments of pH 7 consisting of a nonionic surfactant, an anionic surfactant, and an organic builder manufactured by Wako Pure Chemical Industries, Ltd.) are placed in a centrifuge tube (capacity 50 mL) to prepare a dispersion. To this dispersion, 1.0 g of the toner is added, and the lump of the toner is loosened with a spatula or the like.

The centrifuge tube is shaken with a shaker at 350 spm (strokes per min) for 20 min. After shaking, the solution is transferred to a glass tube for a swing rotor (capacity 50 mL), and separated by a centrifuge (H-9R manufactured by Kokusan Co., Ltd.) at 3500 rpm for 30 min. By this operation, the toner particles are separated from the detached external additive. It is visually confirmed that the toner and the aqueous solution are sufficiently separated, and the toner separated in the uppermost layer is collected with a spatula or the like. The collected toner is filtered with a vacuum filter and then dried with a dryer for 1 h or longer to obtain toner particles. This operation is performed multiple times to ensure the required amount.

Confirmation Method of Structure Shown by Formula (1)

The following method is used to confirm the structure represented by the formula (1) in the organosilicon polymer contained in the toner particle.

The hydrocarbon group represented by R in the formula (1) was confirmed by $^{13}$C-NMR.

Measurement Conditions for $^{13}$C-NMR (Solid)
Equipment: JNM-ECX500II made by JEOL RESONANCE Co., Ltd.
Sample tube: 3.2 mmφ
Sample 150 mg of tetrahydrofuran-insoluble fraction of toner particles for NMR measurement
Measurement temperature: room temperature
Pulse mode: CP/MAS
Measurement nuclear frequency: 123.25 MHz ($^{13}$C)
Reference substance: adamantane (external standard: 29.5 ppm)
Sample rotation speed: 20 kHz
Contact time: 2 ms
Delay time: 2 s
Integration count: 1024 times In this method, a hydrocarbon group represented by R in the formula (1) was confirmed by the presence or absence of a signal due to a methyl group (Si—$CH_3$), an ethyl group (Si—$C_2H_5$), a propyl group (Si—$C_3H_7$), a butyl group (Si—$C_4H_9$), a pentyl group (Si—$C_5H_{11}$), a hexyl group (Si—$C_6H_{13}$) or a phenyl group (Si—$C_6H_5$—) bonded to a silicon atom.

Calculation Method of Proportion of Peak Area Attributed to Structure of Formula (1) in Organosilicon Polymer Included in Toner Particle The measurement of $^{29}$Si-NMR (solid) of the THF insoluble fraction of toner particles is performed under the following measurement conditions.

Measurement Conditions for $^{29}$Si-NMR (Solid)
Equipment: JNM-ECX500II made by JEOL RESONANCE Co., Ltd.
Sample tube: 3.2 mmΩ
Sample: 150 mg of tetrahydrofuran-insoluble fraction of toner particles for NMR measurement
Measurement temperature: room temperature
Pulse mode: CP/MAS
Measurement nuclear frequency: 97.38 MHz ($^{29}$Si)
Reference substance: DSS (external standard: 1.534 ppm)
Sample rotation speed: 10 kHz
Contact time: 10 ms
Delay time: 2 s
Integration count: 2000 times to 8000 times After the above measurement, a plurality of silane components having different substituents and bonding groups in the tetrahydrofuran-insoluble fraction of the toner particles are separated into peaks by curve fitting into the following structure X1, structure X2, structure X3, and structure X4.

$$\text{Structure } X1: (Ri)(Rj)(Rk)\text{SiO}_{1/2} \tag{2}$$

$$\text{Structure } X2: (Rg)(Rh)\text{Si}(\text{O}_{1/2})_2 \tag{3}$$

$$\text{Structure } X3: Rm\text{Si}(\text{O}_{1/2})_3 \tag{4}$$

$$\text{Structure } X4: \text{Si}(\text{O}_{1/2})_4 \tag{5}$$

[Chem. 2]

STRUCTURE X1

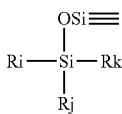
(2)

STRUCTURE X2

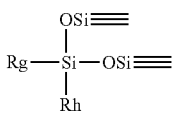
(3)

STRUCTURE X3

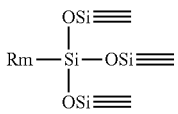
(4)

STRUCTURE X4

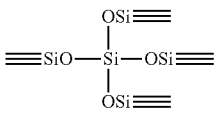
(5)

(In the formulas (2), (3) and (4), Ri, Rj, Rk, Rg, Rh, and Rm represent an organic group such as a hydrocarbon group having from 1 to 6 carbon atoms, a halogen atom, a hydroxy group, an acetoxy group or an alkoxy group bonded to silicon.)

In addition, when it is necessary to confirm the structure represented by the above formula (1) in greater detail, the structure may be identified by the measurement result of $^1$H-NMR together with the measurement result of $^{13}$C-NMR and $^{29}$Si-NMR.

Method for Producing Toner Particle

As a method for producing a toner particle, known means can be used and a kneading and pulverizing method or a wet production method can be used. From the viewpoint of uniform particle size and shape controllability, a wet production method can be preferably used. Furthermore, examples of the wet production method include a suspension polymerization method, a dissolution suspension method, an emulsion polymerization aggregation method, and an emulsion aggregation method.

Here, the suspension polymerization method will be described. In the suspension polymerization method, first, a polymerizable monomer for producing a binder resin and, if necessary, a colorant and other additives are uniformly dissolved or dispersed using a disperser such as a ball mill or an ultrasonic disperser to prepare a polymerizable monomer composition (step of preparing a polymerizable monomer composition). At this time, a polyfunctional monomer, a chain transfer agent, a wax as a release agent, a charge control agent, a plasticizer, and the like can be added as necessary.

Next, the polymerizable monomer composition is put into an aqueous medium prepared in advance, and droplets made of the polymerizable monomer composition are formed into a toner particle of desired size by using a stirrer or a disperser having a high shearing force (granulation step).

It is preferable that the aqueous medium in the granulation step include a dispersion stabilizer in order to control the particle size of the toner particles, sharpen the particle size distribution, and suppress coalescence of the toner particles in the production process. Dispersion stabilizers are generally roughly classified into polymers that develop a repulsive force due to steric hindrance and poorly water-soluble inorganic compounds that achieve dispersion stabilization with an electrostatic repulsive force. The fine particles of the hardly water-soluble inorganic compound are preferably used because they are dissolved by an acid or an alkali and can be easily dissolved and removed by washing with an acid or an alkali after polymerization.

After the granulation step or while performing the granulation step, the temperature is preferably set to at least 50° C. and not more than 90° C. to polymerize the polymerizable monomer contained in the polymerizable monomer composition, and toner particle-dispersed solution obtained (polymerization step).

In the polymerization step, it is preferable to perform a stirring operation so that the temperature distribution in the container is uniform. Where a polymerization initiator is added, the addition can be performed at arbitrary timing and for a required time. In addition, the temperature may be raised in the latter half of the polymerization reaction for the purpose of obtaining a desired molecular weight distribution. Furthermore, in order to remove the unreacted polymerizable monomer and by-products from the system, part of the aqueous medium may be removed by distillation in the latter half of the reaction or after completion of the reaction. The distillation operation can be performed under normal or reduced pressure.

From the viewpoint of obtaining a high-definition and high-resolution image, the toner preferably has a weight average particle size of at least 3.0 μm and not more than 10.0 μm. The weight average particle diameter of the toner can be measured by a pore electric resistance method. The measurement can be performed, as described above, by using "Coulter Counter Multisizer 3" (manufactured by Beckman Coulter, Inc.). The toner particle-dispersed solution thus obtained is sent to a filtration step for solid-liquid separation of the toner particles and the aqueous medium.

The solid-liquid separation for obtaining toner particles from the obtained toner particle-dispersed solution can be carried out by a general filtration method. Thereafter, in order to remove foreign matter that could not be removed from the toner particle, it is preferable to perform reslurrying or further washing with running washing water or the like. After sufficient washing, separation is performed again to obtain a toner cake. Thereafter, the toner cake is dried by a known drying means, and if necessary, a particle group having a particle diameter outside the predetermined range is separated by classification to obtain toner particles. The separated particles having a particle size outside the predetermined range may be reused to improve the final yield.

In the case of forming a surface layer having an organosilicon polymer, when forming toner particles in an aqueous medium, a hydrolyzing solution of an organosilicon compound can be added, as described above, while performing a polymerization step or the like in the aqueous medium, and the surface layer can be formed. The surface layer may be formed by using the toner particle-dispersed solution after polymerization as a core particle-dispersed solution and adding a liquid hydrolysate of the organosilicon compound. Further, in the case of not using an aqueous medium, such as a kneading pulverization method, the surface layer can be formed by dispersing the obtained toner particles in an aqueous medium to be used as a core particle-dispersed solution, and adding a liquid hydrolysate of the organosilicon compound.

Measurement of Amount of Organosilicon Polymer in Toner Particle

The amount of the organosilicon polymer is measured using a wavelength dispersive X-ray fluorescence analyze "Axios" (manufactured by PANalytical) and dedicated software "SuperQ ver.4.0F" (manufactured by PANalytical) provided therewith. Rh is used as the anode of the X-ray tube, the measurement atmosphere is vacuum, the measurement diameter (collimator mask diameter) is 27 mm, and the measurement time is 10 sec. Further, when measuring a light element, the element is detected by a proportional counter (PC), and when measuring a heavy element, the element is detected by a scintillation counter (SC).

A pellet to be used as a measurement sample is prepared by placing 4 g of toner particles in a dedicated aluminum ring for pressing, leveling the toner, and pressing with a tablet molding compressor "BRE-32" (manufactured by Maekawa Test Instruments Co Ltd.) for 60 sec under 20 MPa to form a tablet having a thickness of 2 mm and a diameter of 39 mm.

Silica ($SiO_2$) fine powder is added to 0.5 parts by mass with respect to 100 parts by mass of the toner particles including no organosilicon polymer, and sufficient mixing is performed using a coffee mill. Similarly, the silica fine powder is mixed with the toner particles so as to constitute 5.0 parts by mass and 10.0 parts by mass, respectively, and resulting samples are used as samples for the calibration curve.

For each sample, the pellet of the sample for a calibration curve is prepared as described above using a tablet molding compressor, and a count rate (unit: cps) of Si—Kα rays observed at a diffraction angle (2θ) of 109.08° when using PET as, a spectroscopic crystal is measured. At this time, the acceleration voltage and current value of the X-ray generator are 24 kV and 100 mA, respectively. A calibration curve in the form of a linear function is obtained by plotting the obtained X-ray count rate on the ordinate and plotting the added amount of $SiO_2$ in each sample for a calibration curve on the abscissa.

Next, the toner particles to be analyzed are pelletized as described above using the tablet molding compressor, and the count rate of the Si—Kα rays is measured. Then, the amount of the organosilicon polymer in the toner particles is determined from the above calibration curve.

Method for Measuring Adhesion Ratio of Organosilicon Polymer on Toner Particle Surface A total of 160 g of sucrose (manufactured by Kishida Chemical Co., Ltd.) is added to 100 mL of ion exchanged water and dissolved while forming a hot water bath to prepare a concentrated sucrose solution. Then, 31 g of the concentrated sucrose solution and 6 mL of CONTAMINON N (10% by mass aqueous solution of a neutral detergent for washing precision measuring instruments of pH 7 consisting of a nonionic surfactant, an anionic surfactant, and an organic builder manufactured by Wako Pure Chemical Industries, Ltd.) are placed in a centrifuge tube (capacity 50 mL) to prepare a dispersion. To this dispersion, 1.0 g of the toner is added, and the lump of the toner is loosened with a spatula or the like.

The centrifuge tube is shaken with a shaker at 350 spm (strokes per min) for 20 min. After shaking, the solution is transferred to a glass tube for a swing rotor (capacity 50 mL), and separated by a centrifuge (H-9R manufactured by Kokusan Co., Ltd.) at 3500 rpm for 30 min. It is visually confirmed that the toner and the aqueous solution are sufficiently separated, and the toner separated in the uppermost layer is collected with a spatula or the like. The aqueous solution including the collected toner particles is filtered with a vacuum filter and then dried with a dryer for 1 h or longer. The dried product is crushed with a spatula, and the amount of silicon is measured with fluorescent. X-rays. The adhesion ratio (%) is calculated from the silicon amount ratio of the measurement target of the toner particles after washing and the toner particles before washing.

The measurement of fluorescent X-rays of each element conforms to JIS K 0119-1969, and is specifically as follows.

A wavelength dispersive X-ray fluorescence analyzer "Axios" (manufactured by PANalytical) and dedicated software "SuperQ ver. 4.0F" (manufactured by PANalytical) provided therewith are used for the measurement. Rh is used as the anode of the X-ray tube, the measurement atmosphere is vacuum, the measurement diameter (collimator mask diameter) is 10 mm, and the measurement time is 10 sec. Further, when measuring a light element, the element is detected by a proportional counter (PC), and when measuring a heavy element, the element is detected by a scintillation counter (SC).

A pellet to be used as a measurement sample is prepared by placing about 1 g of washed toner particles and initial toner particles in a dedicated aluminum ring having a diameter of 10 mm for pressing, leveling the toner, and pressing with a tablet molding compressor "BRE-32" (manufactured by Maekawa Test Instruments Co., Ltd.) for 60 sec under 20 MPa to form a tablet having a thickness of about 2 mm.

The measurement is performed under the above conditions, the elements are identified based on the obtained X-ray peak positions, and the concentration thereof is calculated from the count rate (unit: cps) which is the number of X-ray photons per unit time.

As a method for quantitative determination in the toner particle, for example, for the silicon amount, silica ($SiO_2$) fine powder is added to 0.5 parts by mass with respect to 100 parts by mass of the toner particles, and sufficient mixing is performed using a coffee mill. Similarly, the silica fine powder is mixed with the toner particles so as to constitute 2.0 parts by mass and 5.0 parts by mass, respectively, and resulting samples are used as samples for the calibration curve.

For each sample, the pellet of the sample for a calibration curve is prepared as described above using a tablet molding compressor, and a count rate (unit: cps) of Si—Kα rays observed at a diffraction angle (2θ) of 109.08° when using PET as a spectroscopic crystal is measured. At this time, the acceleration voltage and current value of the X-ray generator are 24 kV and 100 mA, respectively. A calibration curve in the form of a linear function is obtained by plotting the obtained X-ray count rate on the ordinate and plotting the added amount of $SiO_2$ in each sample for a calibration curve on the abscissa.

Next, the toner particles to be analyzed are pelletized as described above using the tablet molding compressor, and the count rate of the Si—Kα rays is measured. Then, the amount of the organosilicon polymer in the toner particles is determined from the above calibration curve. The ratio of the silicon amount in the toner particle after washing to the silicon amount in the toner particle before washing calculated by the above method is obtained and taken as the adhesion ratio (%).

External Additive

The toner particle can be made into toner without external additives, but in order to improve flowability, charging performance, cleaning properties, and the like, so-called external additives such as a fluidizing agent, a cleaning aid, and the like may be added to obtain a toner.

Examples of the external additive include inorganic oxide fine particles composed of alumina fine particles, titanium oxide fine particles, and the like, inorganic stearic acid compound fine particles such as aluminum stearate fine particles, zinc stearate fine particles, and the like, and inorganic titanic acid compound fine particles such as strontium titanate, zinc titanate and the like. These can be used alone or in combination of two or more.

These inorganic fine particles are preferably subjected to surface treatment with a silane coupling agent, a titanium coupling agent, a higher fatty acid, silicone oil or the like in order to improve heat-resistant storage stability and environmental stability. The BET specific surface area of the external additive is preferably at least 10 $m^2/g$ and not more than 450 $m^2/g$.

The BET specific surface area can be determined by a low-temperature gas adsorption method using a dynamic constant pressure method according to a BET method (preferably a BET multipoint method). For example, the BET specific surface area ($m^2/g$) can be calculated by using a specific surface area measuring device (trade name: GEMINI 2375 Ver. 5.0, manufactured by Shimadzu Corporation), causing nitrogen gas adsorption on the sample surface, and performing measurement using the BET multipoint method.

The total addition amount of these various external additives is preferably at least 0.05 parts by mass and not more than 5 parts by mass, and more preferably at least 0.1 parts by mass and not more than 3 parts by mass with respect to 100 parts by mass of the toner particles. Further, various external additives may be used in combination.

The toner may have a positively charged particle on the surface of the toner particle. The number average particle diameter of the positively charged particles is preferably at least 0.10 μm and not more than 1.00 μm, and more preferably at least 0.20 μm and not more than 0.80 μm.

It was made clear that where such positively charged particles are present, good transfer efficiency is achieved through durable use. This is conceivably because the positively charged particles having such a particle diameter can roll on the surface of the toner particle and are rubbed between the photosensitive drum 1 and the transfer belt 31 to promote negative charging of the toner, which results in suppression of conversion to a positive charge by the application of transfer bias. The toner of the present invention is characterized by a hard surface, and since positively charged particles are not easily adhered to or buried on the surface of the toner particle, the transfer efficiency can be kept high.

The positively charged particles in the present embodiment are particles that are positively charged when triboelectrically charged by mixing and stirring, with a standard carrier (anionic: N-01) provided by the Imaging Society of Japan.

The number average particle diameter of the external additive is measured using a scanning electron microscope "S-4800" (manufactured by Hitachi, Ltd.). The toner with the external additive externally added thereto is observed, and the major axis of 100 primary particles of the external additive is randomly measured in the field of view enlarged to a maximum of 200,000 times to determine the number average particle size. The observation magnification is adjusted, as appropriate, according to the size of the external additive.

Various methods are conceivable as means for causing positively charged particles to be present on the surface of the toner particle, and any method may be used, but a method of attaching by external addition is preferred. Where the Martens hardness of the toner is within the range of the present invention, the positively charged particles are likely to be uniformly present on the surface of the toner particle. The adhesion ratio of the positively charged particles to the toner particle is preferably at least 5% and not more than 75%, and more preferably at least 5% and not more than 50%. When the adhesion ratio is within this range, it is possible to maintain high transfer efficiency by promoting triboelectric charging of the toner particle and positively charged particles. A method for measuring the adhesion ratio will be described hereinbelow.

As the kind of positively charged particles, hydrotalcite, titanium oxide, a melamine resin and the like are preferable. Of these, hydrotalcite is particularly preferable.

Measurement Method of Adhesion Ratio Positively Charged Particle

In the method for measuring the adhesion ratio of the organosilicon polymer, the element to be measured is taken as an element contained in positively charged particles. For example, in the case of hydrotalcite, magnesium and aluminum are the elements to be measured. In other aspects, the adhesion ratio of positively charged particles is measured by the same method.

Cleaning Blade
Configuration of Cleaning Blade

Figure 3:
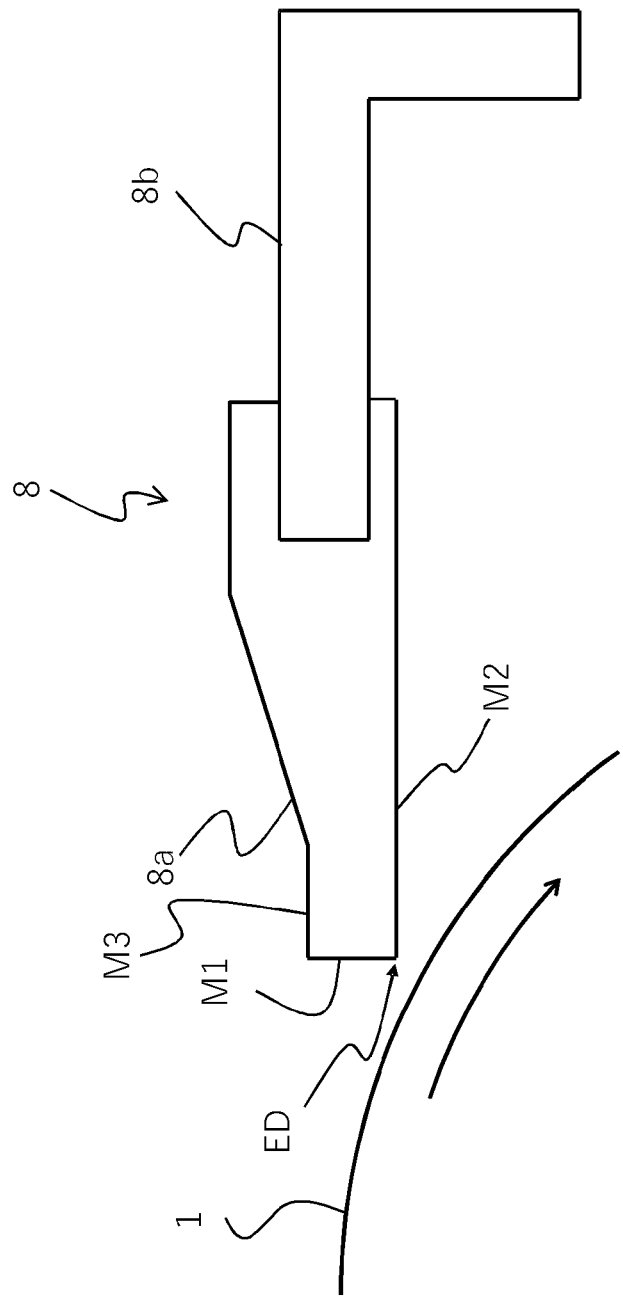
FIG. 3 is a schematic explanatory diagram of a cleaning blade in the embodiment of the present invention.

FIG. 3 is a schematic cross-sectional view of the cleaning blade 8 of the present embodiment taken when a cross section perpendicular to the longitudinal direction (rotational axis direction) of the photosensitive drum 1 is viewed along the longitudinal direction As shown in FIG. 3, the cleaning blade 8 of the present embodiment is configured of an elastic member 8a and a support member 8b that supports the elastic member 8a. The elastic member 8a has a first surface M1 and a second surface M2 that form an edge ED that is a corner portion that comes into contact with the photosensitive drum 1 as a member to be cleaned, and a third surface M3. In the elastic member 8a, the surface located upstream in the rotation direction of the photosensitive drum 1 is the first surface M1, the surface on the downstream side is the second surface M2, and the surface upstream of the first surface M1 is the third surface M3.

That is, the first surface M1 is the distal end surface of the elastic member 8a, and is located upstream of the edge ED in the elastic member 8a in the rotation direction of the photosensitive drum 1 and faces the circumferential surface of the photosensitive drum 1. Depending on the state of contact of the elastic member 8a with the photosensitive drum 1, the region of the first surface M1 on the side adjacent to the edge ED may be in sliding contact with the circumferential surface of the photosensitive drum 1.

The second surface M2 is a side surface that is continuous with the distal end surface of the elastic member 8a, with the edge ED being interposed therebetween, and is positioned in the elastic member 8a downstream of the edge ED in the rotation direction of the photosensitive drum 1 and faces the circumferential surface of the photosensitive drum 1. Depending on the state of contact of the elastic member 8a with the photosensitive drum 1, the region of the second surface M2 on the side adjacent to the edge ED may be in sliding contact with the circumferential surface of the photosensitive drum 1 due to the deflection of the elastic member 8a (see FIG. 4C).

The third surface M3 is a side surface that is continuous with the distal end surface of the elastic member 8a, that is, the first surface M1, on the side opposite to the second surface M2.

The support member 8b is a plate-shaped support member made of a metal sheet metal or the like, and is fixed to the cleaning frame 9. One end of the support member 8b is fixed to the cleaning frame 9, and the elastic member 8a is fixed to the other end, which is a free end, to constitute the cleaning blade 8. One plate portion of the support member 8b bent in an L shape is fixed to the cleaning frame 9 by a fastener such as a screw, and the other plate portion extends in a direction substantially orthogonal to the one plate portion. The elastic member 8a is fixed to the distal end of the other plate portion (see FIG. 2). The support member 8b (the other plate portion) and the elastic member 8a are integrally extended in substantially the same direction from the fixed end (the one plate portion) of the support member 8b. The extension direction is a direction (opposite direction) opposite to the rotation direction of the photosensitive drum 1 at a portion of the circumferential surface of the photosensitive drum 1 where the distal end (the other end) of the elastic member 8a comes into contact. The direction in which the support member 8b and the elastic member 8a extend is a direction from the bottom to the top. The rotation direction of the photosensitive drum 1 is a direction in which a portion of the circumferential surface of the photosensitive drum 1 where the distal end (the other end) of the elastic member 8a comes into contact moves in a direction from the top to the bottom.

In the posture of the process cartridge 7 in FIG. 2, the process cartridge 7 is mounted on the image forming apparatus main body (during use). In this description, when the positional relationship and direction of each member of the process cartridge are described, the positional relationship and direction in this posture are indicated. That is, the up-down direction in FIG. 2 corresponds to the vertical direction, and the left-right direction corresponds to the horizontal direction. The arrangement configuration is set on the assumption that the image forming apparatus is installed on a horizontal plane in a normal installation state.

In the cleaning blade 8 of the present embodiment, the "free end" of the elastic member 8a is the end of the elastic member 8a on the side opposite that of the end supported by the support member 8b. Further, the "free end portion" of the elastic member 8a is the free end and the vicinity thereof. The "edge" is a contact portion of the cleaning blade 8 that is in contact with the member to be cleaned (photosensitive drum 1), and this edge is a ridgeline portion formed in the connection portion of the first surface M1 and the second surface M2 that extend in directions intersecting each other.

The cleaning blade 8 of the present embodiment can be obtained by disposing the support member 8b in a die, and then injecting a raw material composition such as polyurethane elastomer or the like into the die, heating, reacting to cure, and then removing from the die. After removal from the die, the distal end portion of the free end of the elastic member 8a and both ends in the longitudinal direction of the elastic member 8a can be cut as necessary.

The dynamic hardness $DH_s$ of the free end portion (at least at the portion that comes into contact with the photosensitive drum 1) is preferably 0.07 $(mN/\mu m^2) \leq D_s \leq 1.1$ $(mN/\mu m^2)$ and this can be realized by providing a step of curing the free end portion. Where the dynamic hardness $DH_s$ is greater than 1.1, the surface hardness is too large, and edge chipping may occur. Where the dynamic hardness $DH_s$ is less than 0.07, even if the internal hardness near the surface is large, the contact width becomes too large, the peak pressure is lowered and the cleaning performance may be lowered. The step of forming the hardened region at the distal end of the elastic member 8a may be before or after the cutting. As a result, the cleaning blade 8 in which the elastic member 8a and the support member 8b are integrated can be obtained.

Support Member 8b

A material constituting the support member 8b of the cleaning blade 8 of the present embodiment is not particularly limited, and examples thereof include the following materials. Metal materials such as steel plates, stainless steel plates, galvanized steel plates, and chrome-free steel plates, and resin materials such as 6-nylon and 6,6-nylon. Further, the structure of the support member 8b is not particularly limited. One end of the elastic member 8a of the cleaning blade 8 is supported by the support member 8b.

Elastic Member 8a

Examples of the material constituting the elastic member 8a of the cleaning blade 8 of the present embodiment include the following materials. A polyurethane elastomer, ethylene-propylene-diene copolymer rubber (EPDM), acylorntrile-butadiene rubber (NBR), chloroprene rubber (CR), natural rubber (NR), isoprene rubber (IR), styrene-butadiene rubber (SBR), fluororubber, silicone rubber, epichlorohydrin rubber, NBR hydride, polysulfide rubber, etc. As the polyurethane elastomer, a polyester urethane elastomer is preferable because of excellent mechanical properties. The polyurethane elastomer is a material obtained mainly from raw materials such as a polyisocyanate, a polyol, a chain extender, a catalyst, other additives and the like.

Portion for Forming Hardened Region

The portion for forming the hardened region the distal end of the elastic member 8a is at least one surface of the first surface M1 and the second surface M2 that is to be in contact with the member to be cleaned (photosensitive drum 1). Moreover, the internal hardened region close to the surface can also be used.

The hardened region may be further formed on the other surface of the distal end of the elastic member 8a, that is, the third surface M3 which is the surface opposite to second surface M2, and both end surfaces of the elastic member 8a in the longitudinal direction. In this case, the rigidity of the both end surfaces of the elastic member 8a can be improved.

Shape of Elastic Member 8a

In the elastic member 8a of the present embodiment, the angle of the edge formed by the first surface M1 and the second surface M2 is not particularly limited, is usually at least about 85 degrees and not more than about 95 degrees.

The international rubber hardness (IRHD) of the elastic member 8a of the present embodiment is preferably 60 degrees or more, and more preferably 65 degrees or more.

Method for Producing Cleaning Blas
Method of Forming Hardened Region

The method of forming a hardened region at the distal end portion can be performed by applying and curing a material for forming the hardened region. The material for forming the hardened region is used by diluting, as necessary, with a diluting solvent, and can be applied by a well-known means such as dipping, spraying, dispenser, brush coating, roller coating or the like. An isocyanate compound or the like can be used as the material for forming the hardened region. Further, in order for the high-hardness area to be present on the inner side with respect to the surface, it is necessary to sufficiently impregnate the elastic member 8a with a material (such as an isocyanate compound) for forming the hardened region. Since the impregnation is promoted by setting the material for forming the hardened region to a high concentration and low viscosity, it is effective to heat, without diluting or the like, the material for forming the hardened region. The material temperature is preferably 60° C. or higher.

Hereinafter, an example of a method for forming a hardened region will be described by using an isocyanate compound as a material for forming the hardened region. The elastic member 8a coated with a material for forming a hardened region may be referred to as a "precursor".

Material for Forming Hardened Region

The material for forming a hardened region is not particularly limited as long as the material can harden the elastic member 8a, or can form the hardened region on the surface of the elastic member 8a, and examples thereof include an isocyanate compound, an acrylic resin, and the like. The material for forming the hardened region may be diluted with a solvent or the like. The solvent used for dilution is not particularly limited as long as the solvent dissolves the material to be used, and examples thereof include toluene, xylene, butyl acetate, methyl isobutyl ketone, methyl ethyl ketone and the like.

In the case where the constituent material of the elastic member 8a is a polyester urethane elastomer, it is more preferable that an isocyanate compound which is a constituent material of the polyester urethane elastomer be used as the material for forming the hardened region in consideration of compatibility with the elastic member 8a and impregnation into the elastic member 8a. A compound having one or more isocyanate groups in the molecule can be used as the isocyanate compound to be brought into contact with the elastic member 8a. An aliphatic monoisocyanate such as octadecyl isocyanate (ODI), an aromatic monoisocyanate such as phenyl isocyanate (PHI), and the like can be used as the isocyanate compound having one isocyanate group in the molecule. A compound that is normally used for producing a polyurethane resin can be used as the isocyanate compound having two isocyanate groups in a molecule. Specific examples thereof include 2,4-tolylene diisocyanate (2,4-TDI), 2,6-tolylene diisocyanate (2,6-TDI), 4,4'-diphenylmethane diisocyanate (MDI), m-phenylene diisocyanate (MPDI), tetramethylene diisocyanate (TMDI), hexamethylene diisocyanate (HDI), isophorone diisocyanate (IPDI), and the like. Examples of the isocyanate compound having three or more isocyanate groups in a molecule include 4,4',4''-triphenylmethane triisocyanate, 2,4,4'-biphenyl triisocyanate, 2,4,4'-diphenylmethane triisocyanate, and the like. An isocyanate compound having two or more isocyanate groups can also be used in the form of a modified derivative, a multimer, and the like. Among these compounds, in order to efficiently increase the hardness of the hardened region, MDI having high crystallinity, that is, having a symmetrical structure, is preferable, and MDI including a modified body is liquid at room temperature and is, therefore, more preferable from the viewpoint of workability.

The above-described hardened region is preferably further formed on both surfaces of the first surface M1 and the second surface M2 that form the edge ED of the elastic member 8a that comes into contact with the member to be cleaned (photosensitive drum 1). This is because both the first surface M1 and the second surface M2 may be in contact with the photosensitive drum 1 during cleaning.

Method for Measuring Hardness of Cleaning Blade 8

In the present embodiment, the hardness of the hardened region can be measured by the following method. As a measuring device, "Shimadzu Dynamic Ultra Micro Hardness Tester DUH-W211S" manufactured by Shimadzu Corporation can be used. As an indenter, a 115° triangular cone indenter is used, and the dynamic hardness can be obtained from the following calculation formula.

Dynamic hardness: $DHs = \alpha \times P/D2$

In the formula, $\alpha$ represents a constant depending on the shape of the indenter, P represents the test for (mN), and D represents the amount of penetration of the indenter to the sample (indentation depth) (μm).

The measurement conditions are as follows.

α: 3.8584
P: 1.0 mN
Load speed: 0.03 mN/sec
Holding time: 5 sec
Measurement environment: temperature 23° C., relative humidity 5%
Aging of measurement sample: allowed to stand for 6 h or more in an environment of a temperature of 23° C. and a relative humidity of 55%

Measurement Sample Adjustment Method

A method for preparing the measurement sample is described hereinbelow. The measurement sample is cut out to have dimensions of 4 mm in the longitudinal direction (2 mm in both directions from the middle point) and 2 mm from the edge ED in the lateral direction from each of 3 intermediate points (3 places) at 3 locations obtained by dividing the longitudinal direction into 3 equal portions in the image formation region.

The sample is placed so that the indenter is perpendicular to the hardened surface (first surface M1) of the hardened region of the measurement sample, and the dynamic hardness is measured at a position 2 mm from the end in the longitudinal direction and 100 μm from the edge ED in the lateral direction or the thickness direction. This is because the first surface M1 is mainly in contact at the time of contact and plays a main role of holding the toner.

This measurement is performed on three measurement samples, and the average value is taken as the dynamic hardness DHs of the surface of the cleaning blade 8.

Method for Producing Cleaning Blade 8

Production of Cleaning Blade Precursor

A method for producing the cleaning blade 8 in the present embodiment is not particularly limited as long as a suitable method is selected from known methods. Further, a method for producing the elastic member 8a may be suitably selected from well-known methods such as a die molding method and a centrifugal molding method.

For example, in the case of die molding, the support member 8b in which an adhesive is applied to a portion to be in contact with the elastic member 8a is disposed in a cleaning blade die having a cavity for forming the elastic member 8a. Meanwhile, a prepolymer obtained by partial polymerization of polyisocyanate and polyol, and a curing agent including a polyol, a chain extender, a catalyst and other additives are put into a casting machine, and mixed and stirred at a constant ratio in the mixing chamber to obtain a raw material composition such as a polyurethane elastomer. This raw material composition is injected into the die to form a curable molded product (elastic member 8a) on the adhesive-coated surface of the support member 8b, and is removed from the die after reaction curing. If necessary, the elastic member 8a is appropriately cut to ensure a predetermined dimension and the edge size accuracy of the contact portion of the elastic member 8a, thereby making it possible to produce a cleaning blade precursor in which the support member 8b and the elastic member 8a are integrally molded.

When the elastic member 8a is produced with a centrifugal molding machine, a raw material composition such as a polyurethane elastomer obtained by mixing and stirring a prepolymer obtained by partial polymerization of polyisocyanate and polyol, and a curing agent including a polyol, a chain extender, a catalyst and other additives is put into a rotating drum to obtain a polyurethane elastomer sheet. This polyurethane elastomer sheet is cut to ensure predetermined dimensions and the edge size accuracy of the contact portion of the elastic member 8a. The cleaning blade precursor can be produced by attaching the polyurethane elastomer sheet (elastic member 8a) thus obtained to the support member 8b coated with an adhesive.

Formation of Hardened Region

The hardened region can be formed by the method described above. That is, first, a material for forming a hardened region is applied to the first surface M1 and the second surface M2 of the distal end portion of the elastic member 8a of the cleaning blade precursor. Next, the distal end portion of the elastic member 8a is heat-treated, for example, at a temperature of 80° C. or more for 3 min or more. As a result, a hardened region can be formed on the surface and inside the distal end portion of the elastic member 8a.

Where it is necessary to cut the elastic member 8a in order to form the edge for contacting the member to be cleaned (photosensitive drum 1) on the cleaning blade 8, the hardened region may be formed before or after the cutting. In the case of centrifugal molding, the hardened region can be formed before being joined to the support member 8b. The cleaning blade 8 can be obtained as described above.

An example of the produced cleaning blade is described hereinbelow.

Cleaning Blade

In this production example, all integrally molded cleaning blade shown in FIG. 3 was produced and evaluated.

1. Support Member 8b

A galvanized steel sheet having a thickness of 1.6 mm was prepared and processed to obtain a support member 8b having an L-shaped cross section. An adhesive (trade name: Chemlok 219, manufactured by Lord Corp.) for bonding polyurethane resin was applied to the portion of the support member 8b which is to be in contact with the elastic member 8a.

2. Preparation of Raw Material for Elastic Member 8a

The materials of the kinds and amounts shown in the column of Component 1 in Table 1 were reacted under stirring at 80° C. for 3 h to obtain a prepolymer having an isocyanate molarity of 8.50%. A total of 212.9 g of a curing agent composed of the materials of the kinds and amounts shown in the column of Component 2 in Table 1 was mixed with 1000 g of the prepolymer to prepare a polyurethane elastomer composition having a molar ratio of hydroxyl groups to isocyanate groups (α value) of 0.60, and this composition was used as a raw material for the elastic member 8a.

TABLE 1

| | Abbreviation | Material | Amount used (g) |
|---|---|---|---|
| Component 1 | MDI | 4,4'-Diphenylmethane diisocyanate (trade name: Millionate MT, manufactured by Tosoh Corporation) | 321.2 |
| | PBA | Polybutylene adipate polyester polyol having a number average molecular weight of 2500 | 678.8 |
| Component 2 | PHA | Polyhexylene adipate polyester polyol having a number average molecular weight of 1000 | 161.6 |
| | 14BD | 1,4-Butanediol | 28.1 |
| | TMP | Trimethylolpropane | 22.9 |
| | Catalyst A | Polycat 46 (trade name, manufactured by Air Products Japan, Inc.) | 0.07 |
| | Catalyst B | N,N-Dimethylaminohexanol (trade name: Kaolizer No. 25, manufactured by Kao Corp.) | 0.3 |

3. Integrated Molding of Support Member 8b and Elastic Member 8a

The polyurethane elastomer composition was injected into a molding die for a cleaning blade arranged so that the adhesive application portion of the support member 8b protruded into the cavity, followed by curing at 130° C. for 2 min and then removal from the die. Thus, an integrally molded body of the elastic member 8a and the support member 8b was obtained.

This integrally molded body was cut, its appropriate, before forming the hardened region, to obtain an edge angle of 90 degrees, and the distances in the lateral direction, the thickness direction, and the longitudinal direction of the elastic member 8a of 7.5 mm, 1.6 mm, and 237 mm, respectively.

4. Formation of Hardened Region

Modified MDI (trade name; Millionate MTL, manufactured by Tosoh Corporation) was prepared as a material for forming a hardened region. This material for forming a hardened region was heated to 90° C. the elastic member 8a of the integrally molded body was immersed for 30 sec in this material so that five surfaces thereof, with the exception of the surfaces on the side facing the support member 8b (the side surface to which the support member 8b is connected and the surface in contact with the support member 8b in the elastic member 8a in FIG. 3), were immersed, and the material was coated on each surface. Thereafter the material for forming a hardened region on the surface of the elastic member 8a was wiped with a sponge soaked with butyl acetate as a solvent.

In this way, a cleaning blade 8 was obtained in which the hardened region was formed on five surfaces of the elastic member 8a (the first surface M1, the second surface M2, the third surface M3, both end surfaces in the longitudinal direction) and on the inside below these surfaces. The hardened region was formed after 24 hours have elapsed since the molding of the elastic member 8a. The created cleaning blade 8 had a dynamic hardness DHs of 0.3 (mN/μm$^2$).

Positional Relationship Between Cleaning Blade and Photosensitive Drum

In order to generate a force necessary for cleaning the toner having a Martens hardness of at least 200 MPa and not more than 1100 MPa in the cleaning blade 8 having the above features and a slightly deformable distal end, a set male of at least 18° and not more than 26° and a penetration amount of at least 0.6 mm and not more than 1.4 mm are suitable.

Figure 4A:
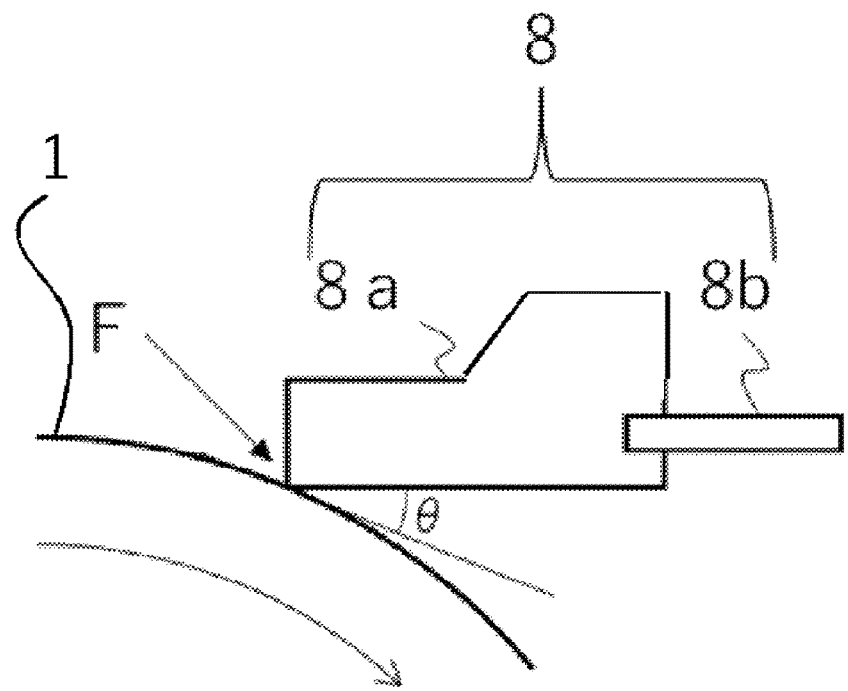
FIG. 4A to FIG. 4C are diagrams for explaining the definition of the contact state of the cleaning blade to a photosensitive drum.
Figure 4B:
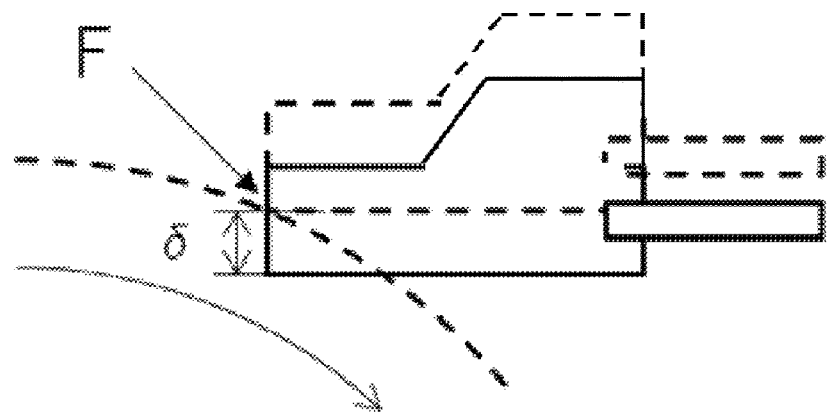
Figure 4C:
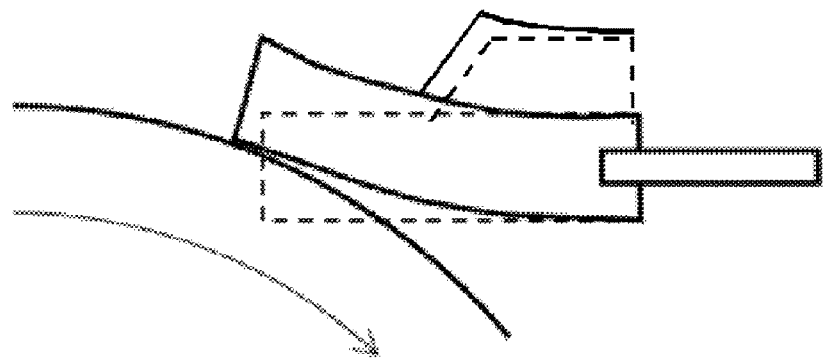

On the cross section perpendicular to the axis of the photosensitive drum 1 such as shown in FIG. 4A to FIG. 4C, the set angle and the penetration amount of the cleaning blade 8 are defined as follows.

(1) Set Angle

An angle θ (FIG. 4A) between the tangent line of the photosensitive drum 1 and the plane (second surface), among the planes sandwiching the edge of the cleaning blade 8, that is on the downstream side in the rotation direction of the photosensitive drum when the cleaning blade 8 is disposed so that the edge of the elastic member 8a thereof is in contact with the photosensitive drum 1 at a virtual point F.

(2) Penetration Amount

Penetration amount (movement amount) δ when the cleaning blade 8 is caused to penetrate (moved) from the virtual point F in a direction of contact with the photosensitive drum 1 in a direction at 90° to the tangent line (FIG. 4B).

The cleaning blade 8 is fixed so that the edge of the cleaning blade 8 is disposed at the positions (1) and (2) in the absence of the photosensitive drum 1. When fixed and in contact with the photosensitive drum 1, the actual cleaning blade 8 is deformed into the shape such as shown in FIG. 4C.

Charging Roller

Figure 5A:
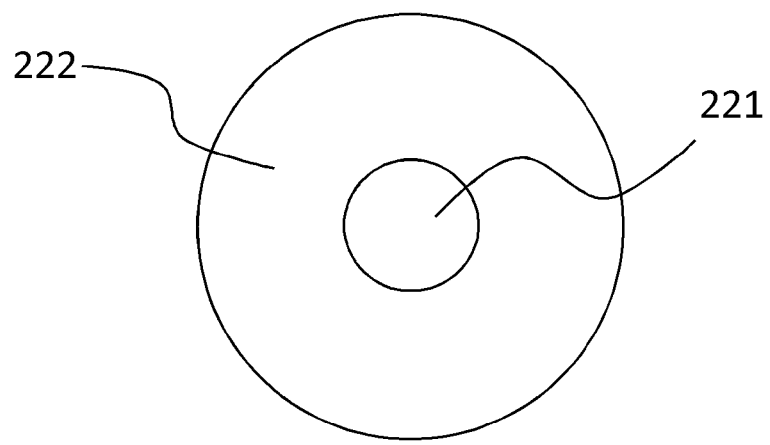
FIG. 5A and FIG. 5B are explanatory diagrams of the sea-island structure on the surface of the charging roller in the embodiment of the present invention.

The configuration of the elastic layer of the charging roller 2 in the present embodiment will be described with reference to FIG. 5A and FIG. 5B. FIG. 5A is a schematic cross-sectional view of the charging roller 2 in the present embodiment, and FIG. 5B is a schematic diagram illustrating the configuration of the outer circumferential surface of the elastic layer of the charging roller 2 in the present embodiment.

As shown in FIG. 5A, the charging roller 2 of the present embodiment includes a metal core 221 as an electrically conductive support and an elastic layer 222 as an elastic layer provided on the outer periphery thereof. A multi-layer configuration may be obtained by additionally disposing a surface layer on the outer side of the elastic layer 222.

Figure 5B:
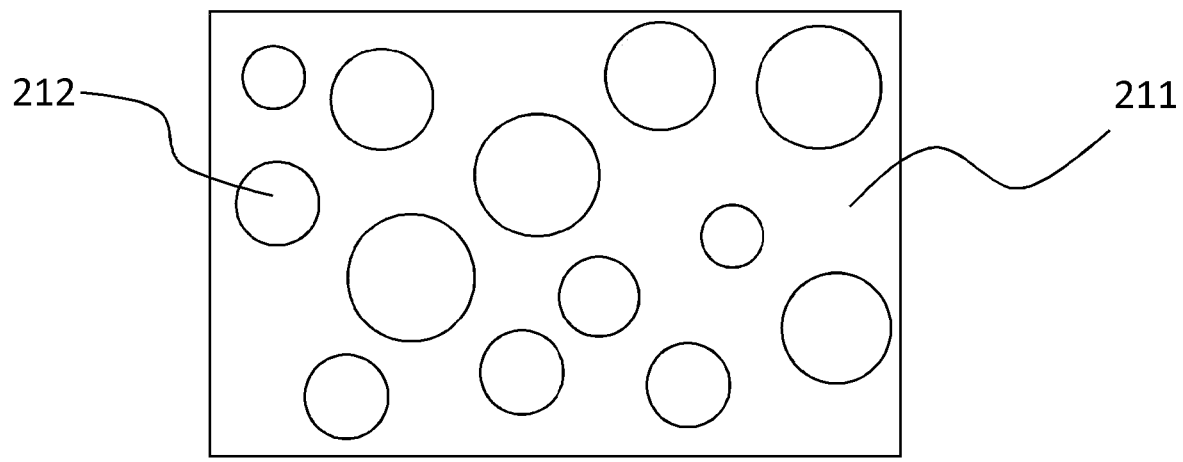

As shown in FIG. 5B, the outer circumferential surface of the elastic layer 222 is configured to have a circumferential surface structure (pattern) in which portions (islands) composed of domains 212 are scattered on the surface (sea) composed of the matrix 211 (sea-island structure). The domains 212 and the matrix 211 are made of different types of rubber materials.

Elastic Layer

The elastic layer 222 of the present embodiment is characterized by being a semiconductive rubber composition formed f om two or more types of rubber. The elastic layer 222 includes conductive domains 212 mainly composed of a raw material rubber A and the matrix 211 mainly composed of a raw material rubber B and having a volume resistivity higher than that of the domains 212. The domains 212 form an island phase of the sea-island structure, and the matrix 211 forms a sea phase.

Domains

The domain 212 in the present embodiment is conductive and preferably has the raw material rubber A blended with a conductive agent.

Carbon black, graphite, conductive oxides such as tin oxide, metals such as copper and silver, conductive particles provided with conductivity by covering the particle surfaces with an oxide or a metal, and ionic conductive agent having ion exchange performance such as a quaternary ammonium salt may be used as the conductive agent. Examples of the ionic conductive agent include inorganic ionic substances such as lithium perchlorate, sodium perchlorate, and calcium perchlorate; cationic surfactants such as lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide, and modified aliphatic dimethylethylammonium ethosulphate; amphoteric surfactants such as lauryl betaine, stearyl betaine, and dimethylalkyllauryl betaine; quaternary ammonium salts such as tetraethylammonium perchlorate, tetrabutylammonium perchlorate and trimethyloctadecylammonium perchlorate; and organic acid lithium salts such as lithium trifluoromethanesulfonate. These may be used alone or in combination of two or more.

The blending amount of the conductive agent is generally at least 1 part by mass and not more than 200 parts by mass with respect to 100 parts by mass of the raw material rubber A.

The conductive agent of the present embodiment is preferably one that reduces the electric resistance value so as not to cause streak-like density changes on the image through the use environment and long-term use. For example, the domains preferably include a conductive agent that is electron conductive. Specifically, the domains preferably include carbon black, graphite, a conductive oxide such as tin oxide, a metal such as copper and silver, and conductive particles imparted with electric conductivity by coating the particle surface with an oxide or a metal, and more preferably include carbon black.

The raw material rubber A is not particularly limited, and rubbers known in the field of electrophotographic conductive members can be used. Specific examples include natural rubber, isoprene rubber, butadiene rubber, styrene-butadiene, butyl rubber, ethylene-propylene rubber, ethylene-propylene-diene terpolymer rubber, silicone rubber and the like.

Matrix

The matrix 211 in the present embodiment has a higher volume resistivity than the domains 212.

The raw material rubber B forming the matrix 211 is not particularly limited, and rubbers known in the field of electrophotographic conductive members can be used. Specific examples include epichlorohydrin homopolymer, epichlorohydrin-ethylene oxide copolymer, epichlorohydrin-ethylene oxide-allyl glycidyl ether terpolymer, acrylonitrile-butadiene copolymer, acrylonitrile-butadiene copolymer hydrogenation product, and rubbers such as silicone rubber, acrylic rubber and urethane rubber which are used individually or as blends of two or more thereof. In order to reduce the amount of contamination defects on the charging roller 2, it is preferable that the second raw material rubber B have a lower volume resistivity than the raw material rubber A forming the domains 212.

It is preferable that the raw material rubber B be a polar rubber, the raw material rubber A be incompatible with the raw material rubber B, and the Sp value of the raw material rubber A be smaller than the Sp value of the raw material rubber B.

Generally, when two or more kinds of rubbers are blended, depending on the mixing conditions, etc., the greater the difference in SP value between the rubbers, the more incompatible the rubbers and the more stable the islands that are formed.

Measurement of Volume Resistivity

For the measurement of the volume resistivity of the domains 212 and the matrix 211, a measurement value (volume resistivity) measured by the conductive mode using an atomic force microscope (AFM) can be adopted. A part of the elastic layer is cut out using a manipulator, and metal vapor deposition is performed on one side of the slice. A DC power source is connected to the surface on which metal deposition has been performed, a voltage is applied, the free end of a cantilever is brought into contact with the other surface of the cut slice, and a current image is obtained through the AFM main body. A current value at 10 locations is randomly measured in the domain 212 and the matrix 211, and the volume resistivity can be calculated from the average current value at the top 10 locations with the low current values and from the average film thickness and the contact area of the cantilever. Further, by observing a current image obtained by AFM, the volume resistivity relationship between the domain 212 and the matrix 211 can be easily evaluated.

Formation of Sea-Island Structure

Generally, in the case of a blend of incompatible rubbers, a sea-island structure depends on the rubber viscosity and kneading conditions of each rubber, but rubber having a large composition ratio tends to become a sea phase. Therefore, by increasing the ratio of the raw material rubber B forming the matrix 211 in the present embodiment, it is possible to form the domains 212 as an island phase and the matrix 211 as a sea phase.

Specifically, the blending ratio of the raw material rubbers B and A, that is, the (raw material rubber B)/(raw material rubber A) ratio (mass ratio) is preferably in the range of 95/5 to 40/60.

Furthermore, volume resistivity of the elastic layer can be changed by changing the blending ratio of the domains 212 (island phase) and the matrix 211 (sea phase) and changing the presence ratio of the domains 212 (island phase). Therefore, the volume resistivity of the obtained charging roller 2 can be easily set to a desired value.

Production Method

As a method of forming the elastic layer 222, it is preferable to mix the raw materials of the conductive elastic body with a closed mixer and form the elastic layer by a known method such as extrusion molding, injection molding, or compression molding. The elastic layer may be produced by directly forming the conductive elastic body on a conductive substrate, or a conductive elastic body previously formed into a tube shape may be coated on a conductive substrate. The surface may be polished and the shape may be adjusted after the elastic layer is formed.

Electric Resistance Value of Charging Roller

Figure 7:
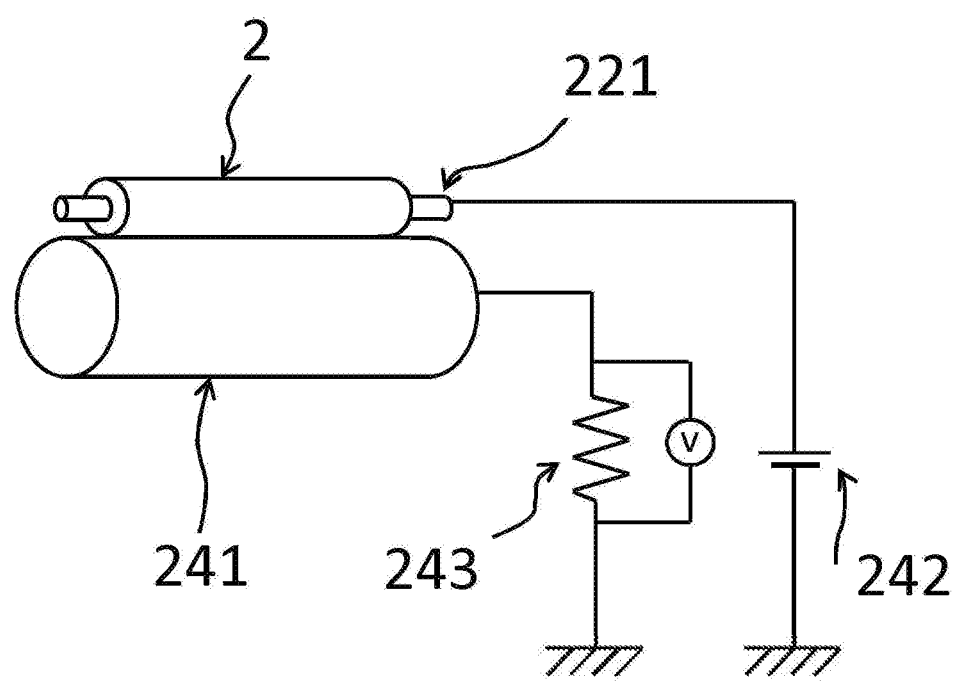
FIG. 7 is a schematic diagram for explaining an apparatus for measuring an electric resistance value.

FIG. 7 shows a schematic diagram of a device for measuring the electric resistance of the charging roller 2. The charging roller 2 is pressed against a cylindrical aluminum drum 241 by pressing means (not shown) at both ends of the core 221 and is driven to rotate following the rotation of the aluminum drum 241. In this state, a DC voltage is applied to the core 221 of the charging roller 2 by using an external power source 242, and the electric resistance value of the charging roller 2 can be measured from the voltage applied to a reference resistor 243 connected in series to the aluminum drum 241.

A range of at least $1 \times 10^6 \Omega$ and not more than $1 \times 10^{14} \Omega$ when a voltage of 200 V is applied in an environment of 25° C. and 50% RH is preferable for the electric resistance value of the charging roller in the present embodiment. In particular, the electric resistance value of the charging roller 2 in the present embodiment is more preferably at least $1 \times 10^6 \Omega$ and not more than $1 \times 10^9 \Omega$.

When the electric resistance value of the charging roller 2 in the present embodiment is $1 \times 10^6 \Omega$ or more, the increase in the downstream discharge amount becomes significant.

As a result, the toner after passing through the charging roller 2 can be negatively charged by using the downstream discharge. Further, by setting the electric resistance value of the charging roller 2 of the present embodiment to $1 \times 10^9 \Omega$ or less, it is possible to further suppress the occurrence of image defects due to insufficient electric resistance.

Further, the uniformity of the electrical characteristics of the elastic layer 222 is determined by rotating the charging roller 2 once, measuring the maximum value and the minimum value of the electric resistance value during the rotation, and taking the circumferential unevenness calculated from the maximum value/minimum value as an indicator of the uniformity. The circumferential unevenness is preferably 1.5 or less.

Further, the charging roller 2 may be driven by the photosensitive drum 1 that is driven by surface movement, and may be actively rotationally driven at a predetermined circumferential speed in the forward direction or the reverse direction with respect to the surface movement direction of the photosensitive drum 1, that is, may be rotated by receiving a driving force from a power source such as a motor.

Example

Hereinafter, the charging roller and toner used in Examples and Comparative Examples of the present invention will be described.

In the following description, the numbers 2-1 and 2-2 attached to the charging roller and the numbers 1 to 6 attached to the toner are for distinguishing the types thereof. These are different from the reference numerals "2" and "10" in the drawings or those given in other explanations referred to the drawings.

Charging Roller 2-1

As shown in FIG. 5B, the elastic layer 222 of the charging roller 2-1 is formed of domains 212 that form an island portion and a matrix 211 that forms a sea portion.

Method for Producing Charging Roller

Hereinafter, the present invention will be described more specifically with reference to production examples and Examples, but the present invention is not limited thereto in any way. In addition, all the parts in the following blends are on the mass basis.

A total of 100 parts of ethylene-propylene-diene terpolymer (EPT4045, manufactured by Mitsui Petrochemical Co., Ltd.) as the raw material rubber A, 10 parts of Ketjen black (Ketjen Black EC600JD, manufactured by Ketjen Black International Co.) as conductive particles, and 1 part of stearic acid and 3 parts of zinc oxide as processing aids were kneaded with a pressure kneader to obtain a master batch 1.

Next, 75 parts of acrylonitrile-butadiene copolymer (Nipol of DN219 manufactured by Nippon Zeon Co., Ltd.) as the raw material rubber B, 1 part of stearic acid and 3 parts of zinc oxide as processing aids, 25 parts of a master batch 1, 0.5 parts of sulfur as a vulcanizing agent, 1.5 parts of tetramethylthiuram disulfide (Nocceller TT, manufactured by Ouchi Shinko Chemical Industrial Co Ltd.) as a vulcanization aid, and 2.0 parts of N-cyclohexyl-2-benzothiazolylsulfenamide (Nocceller CZ, manufactured by Ouchi Shinko Chemical Industrial Co., Ltd.) were mixed with an open roll to obtain an unvulcanized rubber composition.

Next, a round bar having a total length of 252 mm and an outer diameter of 6 mm was prepared by subjecting the surface of free-cutting steel to electroless nickel plating. An adhesive was applied over the entire circumference of the round bar in a range of 230 mm excluding 11 mm at both ends. A conductive hot-melt type adhesive was used. A roll coater was used for coating. In this Example, the round bar coated with the adhesive was used as a conductive shaft core (core 221).

Next, a crosshead extruder having a conductive shaft core supply mechanism and an unvulcanized rubber roller discharge mechanism was prepared, a die having an inner diameter of 10.5 mm was attached to the crosshead, the extruder and the crosshead were adjusted to 80° C., and the conveyance speed of the conductive shaft core was adjusted to 60 mm/sec. Under these conditions, the unvulcanized rubber composition was supplied from the extruder, and the unvulcanized rubber composition was coated on the conductive shaft core (core 221) within the crosshead as an elastic layer (elastic layer 222) to obtain an unvulcanized rubber roller. Next, the unvulcanized rubber roller was put in a hot-air vulcanization furnace at 170° C. and heated for 60 min to obtain an unpolished conductive elastic roller. Then, the end parts of the elastic layer were cut and removed. Finally, the surface of the elastic layer was polished with a rotating grindstone. As a result, a charging roller 2-1 having a diameter of 8.4 mm at positions of 90 mm from the central portion to both end portions and a central diameter of 8.5 mm was obtained.

An ultrathin slice having a thickness of about 0.1 μm was prepared from the elastic layer 222 of the charging roller 2-1 obtained as described above, and the dispersion state of the polymer and the dispersion state of the conductive particles were observed under a transmission electron microscope (TEM). As a result, it was confirmed that the elastic layer 222 of the charging roller 2-1 was formed of the domains 212 forming the island portion and the matrix 211 forming the sea portion. Further, the volume resistivity of the domains 212 and the matrix 211 was measured using an atomic force microscope (AFM), and it was confirmed that the matrix 211 had a higher volume resistivity than the domains 212.

Next, the electrical characteristics of the charging roller 2-1 were measured. As a result, the electric resistance value in a low-temperature and low-humidity environment (15° C., 10% RH, hereinafter referred to as L/L) was $1.8 \times 10^5 \Omega$ when 25 V was applied and $9.0 \times 10^4 \Omega$ when 100 V was applied, and the circumferential unevenness was 1.3 times.

Charging Roller 2-2

A total of 100 parts of acrylonitrile-butadiene copolymer (Nipol DN219, manufactured by Nippon Zeon Co., Ltd.), 35 parts of carbon black (Toka Black #7360SB, ma manufactured by Tokai Carbon Co., Ltd.) as conductive particles, 1 part of stearic acid and 3 parts of zinc oxide as processing aids, 0.5 part of sulfur as a vulcanizing agent, 1.5 part of tetramethylthiuram disulfide (Nocceller TT, manufactured by Ouchi Shinko Chemical Industrial Co., Ltd.) as a vulcanization aid, and 2.0 parts of N-cyclohexyl-2-benzothiazolylsulfenamide (Nocceller CZ, manufactured by Ouchi Shinko Chemical Industrial Co., Ltd.) were mixed with an open roll to obtain an unvulcanized rubber composition. Thereafter, the charging roller 2-2 was obtained in the same manner as the charging roller 2-1.

Next, the electrical characteristics of the charging roller 2-2 were measured. As a result, the electric resistance value at L/L was $9.3 \times 10^5 \Omega$ when 25 V was applied and $3.2 \times 10^4 \Omega$ when 100 V vas applied, and the circumferential unevenness was 2.1 times.

Hereinafter, manufactured toners 1 to 6 are described.

Toner 1

Step of Preparing Aqueous Medium 1

A total of 14.0 parts of sodium phosphate (RASA Industries, Ltd., dodecahydrate) was added to 1000.0 parts of ion exchanged water in a reaction vessel, and kept at 65° C. for 1.0 h while purging with nitrogen.

An aqueous calcium chloride solution obtained by dissolving 9.2 parts of calcium chloride (dihydrate) in 10.0 parts of ion exchanged water was loaded while stirring at 12,000 rpm using a T. K. Homomixer (manufactured by Tokushu Kika Kogyo Co., Ltd.) to prepare an aqueous medium including a dispersion stabilizer. Furthermore, 10% by mass hydrochloric acid was added to the aqueous medium, and the pH was adjusted to 5.0, whereby an aqueous medium 1 was obtained.

Step of Hydrolyzing Organosilicon Compound for Surface Layer

In a reaction vessel equipped with a stirrer and a thermometer, 60.0 parts of ion exchanged water was weighed and the pH was adjusted to 3.0 using 10% by mass hydrochloric acid. Heating was then performed under stirring to bring the temperature to 70° C. Thereafter, 40.0 parts of methyltriethoxysilane, which is an organosilicon compound for the surface layer, was added and stirred for 2 h or longer to conduct hydrolysis. The end point of hydrolysis was visually confirmed by the formation of a single layer, without separation, of oil and water, and cooling was performed to obtain a hydrolysate of the organosilicon compound for the surface layer.

Step of Preparing Polymerizable Monomer Composition

| Styrene | 60.0 parts |
| C.I. Pigment Blue 15:3 | 6.5 parts |

The aforementioned materials were put into an attritor (manufactured by Mitsui Miike Chemical Engineering Machinery, Co., Ltd.), and further dispersed using zirconia particles having a diameter of 1.7 mm at 220 rpm for 5.0 h to prepare a pigment-dispersed solution. The following materials were added to the pigment-dispersed solution.

| Styrene | 20.0 parts |
| n-Butyl acrylate | 20.0 parts |
| Crosslinking agent (divinylbenzene) | 0.3 parts |
| Saturated polyester resin | 5.0 parts |

(Polycondensation product of propylene oxide-modified bisphenol A (2 mol adduct) and terephthalic acid (molar ratio 10:12), glass transition temperature Tg=68° C., weight average molecular weight Mw=10,000, molecular weight distribution Mw/Mn=5.12)
Fischer-Tropsch wax (melting point 78° C.) 7.0 parts The pigment-dispersed solution to which the above materials were added was kept at 65° C. and uniformly dissolved and dispersed at 500 rpm using a T. K. Homomixer (manufactured by Tokushu Kika Kogyo Co., Ltd.) to prepare a polymerizable monomer composition.

Granulation Step

The polymerizable monomer composition was loaded into the aqueous medium 1 while maintaining the temperature of the aqueous medium 1 at 70° C. and the rotational speed of the T. K. Homomixer at 12000 rpm, and 9.0 parts of t-butyl peroxypivalate as a polymerization initiator was added. The mixture was granulated for 10 min while maintaining 12,000 rpm of the stirring device.

Polymerization Step

After the granulation step, the stirrer was replaced with a propeller stirring blade and polymerization was performed for 5.0 h while maintaining at 70° C. under stirring at 150 rpm, and then polymerization reaction Was carried out by raising the temperature to 85° C. and heating for 2.0 h to obtain core particles. When the pH of the slurry was measured after cooling to 55° C., the pH was 5.0. With the stirring continued at 55° C., 20.0 parts of the hydrolysate of the organosilicon compound for the surface layer was added to start the surface layer formation on the toner particle. After maintaining as is for 30 min, the slurry was adjusted to pH=9.0 for completion of condensation by using an aqueous sodium hydroxide solution and further maintained for 300 min to form a surface layer.

Washing and Drying Step

After completion of the polymerization step, the toner particle slurry was cooled, hydrochloric acid was added to the toner particle slurry to adjust the pH to 1.5 or lower, the slurry was allowed to stand under stirring for 1 h, and then solid-liquid separation was performed with a pressure filter to obtain a toner cake. The toner cake was reslurried with ion exchanged water to obtain a dispersion again, followed by solid-liquid separation with the above-mentioned filter. Reslurrying and solid-liquid separation were repeated until the electric conductivity of the filtrate became 5.0 μS/cm or less, and finally solid-liquid separation was performed to obtain a toner cake.

The obtained toner cake was dried with an air flow drier FLASH JET DRIER (manufactured by Seishin Enterprise Co., Ltd.), and fine particles were cut using a multi-division classifier utilizing the Coanda effect to obtain a toner particle 1. The drying conditions were a blowing temperature of 90° C. and a dryer outlet temperature of 40° C., and the supply speed of the toner cake was adjusted so that the outlet temperature did not deviate from 40° C. according to the moisture content of the toner cake.

In the cross-sectional TEM observation of the toner particle 1, the silicon mapping was performed, and it was confirmed that silicon atoms were present on the surface layer. In the subsequent toner production examples, for the surface layer including the organosilicon polymer, it as also confirmed by the same silicon mapping that silicon atoms were present in the surface layer. In this production example, the obtained toner particles 1 were used as a toner 1 as they were, without external addition.

Methods for evaluating the toner 1 will be described below.

Measurement of Martens Hardness

The measurement was performed by the method described in the "Method for Measuring Martens Hardness of Toner".

Method for Measuring Adhesion Ratio

The measurement was performed by the method described in the "Method for Measuring Adhesion Ratio of Organosilicon Polymer on Toner Particle Surface".

Toner 2, Toner 3

The toners were prepared in the same manner as the toner 1 except that the conditions at the time of adding the hydrolysate in the polymerization step and the retention time after the addition were changed as shown in Table 2. The pH of the slurry was adjusted with hydrochloric acid and aqueous sodium hydroxide solution. Table 2 shows the measurement results for the obtained toner 2 and toner 3.

Toner 4

External addition to the toner 1 was performed as shown in Table 3 to prepare toner 4. In the external addition method, an external additive was placed in SUPERMIXER PICCOLO SMP-2 (manufactured by Kawata Co., Ltd.) in the number of parts, with respect to 100 parts of the toner particles, shown in Table 3, and mixing was performed at 3000 rpm for 10 min. Table 2 shows the measurement results for the obtained toner.

Toner 5

A toner 5 was prepared in the same manner as the toner 1 except that the conditions at the time of adding the hydrolysate in the polymerization step and the retention time after the addition were changed as shown in Table 2. Table 2 shows the evaluation results of the obtained toner.

Toner 6

The step of hydrolyzing organosilicon compound for surface layer was not performed. Instead, 30 parts of methyltriethoxysilane of the organosilicon compound for the surface layer was added as a monomer (step of preparing polymerizable monomer composition).

In the polymerization step, after cooling to 70° C. and measuring the pH, no hydrolysate was added. While the stirring was continued at 70° C., the slurry was adjusted to pH=9.0 for completion of condensation by using an aqueous sodium hydroxide solution and was maintained for 300 min to form a surface layer.

The evaluation results for the obtained toner 6 are shown in Table 2.

TABLE 2

| | Number of added parts of polymerization initiator | Number of added parts of crosslinking agent | Type of organosilicon compound for surface layer | Conditions at the time of hydrolysate addition | | | Conditions after the addition of hydrolysate Retention time until pH adjustment for condensation completion | Adhesion ratio of organosilicon polymer (%) | Martens hardness (MPa) |
|---|---|---|---|---|---|---|---|---|---|
| | | | | Slurry pH | Slurry temperature | Number of added parts of hydrolysate | | | |
| Toner 1 | 9.0 | 0.3 | Methyltri- ethoxysilane | 5.0 | 55 | 20.0 | 30 | 97 | 598 |
| Toner 2 | | | | 9.0 | 70 | 20.0 | 0 | 96 | 203 |
| Toner 3 | | | | 5.0 | 40 | 20.0 | 90 | 95 | 1092 |
| Toner 4 | | | | 5.0 | 55 | 75.0 | 30 | 90 | 950 |
| Toner 5 | | | | 5.0 | 55 | 80.0 | 30 | 87 | 1200 |
| Toner 6 | | | | Added in step of preparing a polymerizable monomer, without hydrolysis. See the present text. | | | | 85 | 153 |

TABLE 3

| External addition | Contents | Particle diameter of external additive (μm) | Number of parts of external additive | Adhesion ratio of external additive (%) |
|---|---|---|---|---|
| Toner 1 to 3 | None | | | |
| Toner 4 | DHT-4A | Positively charged particles: hydrotalcite | 0.25 | 0.2 | 10 |
| Toner 5, 6 | None | | | |

In the table, DHT-4A (registered trademark) is manufactured by Kyowa Chemical Industry Co. Ltd.

In Examples 1 to 5 and Comparative Examples 1 to 5, combinations of toners 1 to 6, charging rollers 2-1 and 2-2, and penetration amounts of cleaning blades of 0.6 mm and 1.0 mm, such as shown in Table 4, were prepared.

Tests

Torque

The developer storage chamber 18b of the process cartridge 7 was filled with 100 g of the toner. Similarly, the cleaning blades of Examples 1 to 5 and Comparative Examples 1 to 5 were attached to the photosensitive member unit 13, and the set angle θ was set to 22°.

In a state of contact with the developing roller at a room temperature of 15° C. and a relative humidity of 10% Rh, a voltage of ~1 kV was applied to the charging roller, the developing roller was grounded, and a voltage of ~100 kV was applied to the supply roller and the regulating member, while rotating at a photosensitive member surface speed of 296 mm/s and a developing roller surface speed of 425 mm/s.

The photosensitive member driving torque within 2 sec after 30 sec from the start of rotation was measured. Evaluation was performed as follows.

| | |
|---|---|
| A: good low torque property | 0.07 N · m or less |
| B: has a low torque effect | more than 0.07 N · m and not more than 0.12 N · m |
| C: low torque effect is negligible | more than 0.12 N · m |

Evaluations A and B were considered to have an effect of reducing torque. The results are shown in the "Torque" column of Table 4.

Charging Member Contamination

The image forming apparatus 100 was used to form 30,000 prints of images with a print percentage of 1% in an environment with a room temperature of 15° C. and a relative humidity of 10% Rh. An intermittent time of 3 seconds was provided for every two images formed.

The photosensitive member surface speed was 296 mm/s, the developing roller surface speed was 425 mm/s, the photosensitive member surface potential was −500 V, the voltage applied to the developing roller was −350 V, the supply roller voltage was −450 V, and the regulating member voltage was −450 V.

The degree of contamination of the charging roller after the formation of 30,000 images was evaluated. Evaluation was performed as follows.
A: there is no visible dirt and no effect on the image
B: there is visible dirt, but no effect on the image
C: there is visible dirt, and also there is effect on the image The effect on the image is considered to be an occurrence of streaks due to contamination of the charging roller in the recording material conveyance direction on a halftone image.

The results are shown in the "Charging member contamination" column in Table 4. A and B having no effect on the image were regarded as demonstrating the effect of the invention.

TABLE 4

| | Toner | Charging roller | Penetration amount (mm) | Torque | Charging member contamination |
|---|---|---|---|---|---|
| Example 1 | Toner 1 | Charging roller 2-1 | 0.6 | A | B |
| Example 2 | Toner 1 | Charging roller 2-1 | 1.0 | B | A |
| Example 3 | Toner 2 | Charging roller 2-1 | 0.6 | A | B |
| Example 4 | Toner 3 | Charging roller 2-1 | 0.6 | A | B |
| Example 5 | Toner 4 | Charging roller 2-1 | 0.6 | A | B |
| Comparative Example 1 | Toner 5 | Charging roller 2-1 | 0.6 | B | C (Scratches also on drum) |
| Comparative Example 2 | Toner 6 | Charging roller 2-1 | 0.6 | B | C (Scratches also on drum) |
| Comparative Example 3 | Toner 6 | Charging roller 2-1 | 1.0 | C | A |
| Comparative Example 4 | Toner 1 | Charging roller 2-2 | 0.6 | A | C |
| Comparative Example 5 | Toner 6 | Charging roller 2-2 | 0.6 | B | C |

In Examples 1 to 5, the torque was 0.12 N·m or less, and it was understood that the torque can be reduced.

Figures 6A, 6B, 6C:
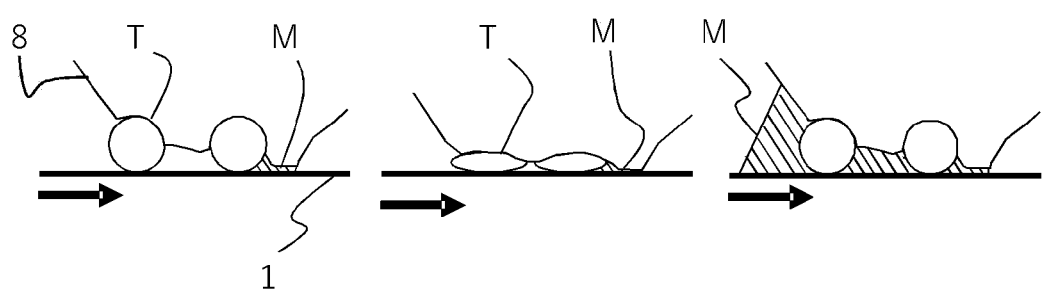
FIG. 6A to FIG. 6C are explanatory diagrams of the mechanism of the toner interposition state in the cleaning blade contact portion in the embodiment of the present invention.

Further, as a result of setting the adhesion ratio of the organosilicon polymer on the surface of the toner particle to 90% or more, as shown in FIG. 6A, the amount of the organosilicon polymer peeled off from the toner particle at the contact portion between the cleaning blade 8 and the photosensitive drum 1 as the image bearing member is small.

Meanwhile, when a toner particle (T) that cannot be easily deformed and has a Martens hardness of at least 200 MPa and not more than 1100 MPa is sandwiched between the cleaning blade 8 and the photosensitive drum 1, the toner acts as a spacer, the contact area is reduced, and the torque can be further reduced.

In this state, as a result of setting the penetration amount of the cleaning blade (dynamic hardness DHs=0.3 mN/μm 2) of the present embodiment to 1.0 mm, a sufficient force could be applied to the toner particle, no slip-through occurred and contamination of the charging member could be suppressed. Further, when the contact pressure of the cleaning blade was lowered (intrusion amount 0.6 mm), although some slip-through occurred, since the charging roller had a sea-island structure, there was no effect on the image even if some dirt adhered.

The reason for this is described hereinbelow. In the case of a charging roller having a sea-island structure, the surface potential of the island phase having a low volume resistivity is higher than that of the sea phase having a high volume resistivity (minus side). Since the polarity of the organosilicon polymer peeled from the toner particle is negative, dirt easily adheres electrically to the sea phase having a low surface potential. However, since the sea phase has a high volume resistivity and is difficult to discharge, the image is hardly affected.

Meanwhile, when the island phase also comes into contact with the photosensitive drum 1, dirt may temporarily adhere. However, since the charging roller has a crown shape, the dirt could be returned to the photosensitive drum as a result of recharging due to a difference in circumferential speed with the photosensitive drum 1. For the above reasons, there was no effect on the image even when some dirt adhered to the sea phase.

In Comparative Example 1, since the adhesion ratio of the organosilicon polymer was low, the gap formed by the cleaning blade, the toner, and the photosensitive drum was filled with the organosilicon polymer, the contact area was increased, and the torque became a little higher than that in Example 1. Further, since the contact pressure (penetration amount) of the cleaning blade was low and the adhesion ratio was low, particles of the organosilicon polymer surface layer, which were peeled off from the toner particle when a large number of prints were outputted, adhered to portions of the charging member having a high volume resistivity and stayed thereon causing scratches on the photosensitive drum and slip-through of the toner.

In Comparative Example 2, since the Martens hardness of the toner was low and the adhesion ratio of the organosilicon was low, the torque was slightly higher than in Example 1.

Where the Martens hardness of the toner is 200 MPa or less, the toner is deformed flat at the contact portion as shown in FIG. 6B, the contact area between the elastic layer of the charging roller and the photosensitive drum through the toner is increased and the torque is increased. Further, it is considered that, as shown in FIG. 6C, the gap formed by the cleaning blade, the toner, and the photosensitive drum was filled with the organosilicon polymer (denoted by M in FIG. 6A to FIG. 6C) peeled off from the toner particle in the cleaning portion and other places, the contact area was increased, and the torque was increased.

In Comparative Example 3, since the contact pressure (penetration amount) of the cleaning blade was higher than that in Comparative Example 2, no image defect due to drum scratches occurred, but the torque was increased.

In Comparative Examples 4 and 5, the torque was satisfactory because the contact pressure of the cleaning blade was low. In the charging roller having a sea-island structure, dirt selectively adheres to a portion having a high volume resistivity. Meanwhile, in Comparative Examples 4 and 5, since the charging roller 2-2 having no sea-island structure was used, the organosilicon polymer, which peeled off from the toner particle, adhered to the entire charging member contributing to charging, and the charging member was contaminated As described above, according to the present invention, the contact area between the photosensitive drum and the cleaning blade can be kept small while utilizing the characteristics of the surface of the charging member having a sea-island structure, and a sufficient holding pressure can be applied to the toner at the contact portion. Accordingly, it is possible to provide a process cartridge that can suppress the occurrence of charging member contamination while reducing the driving torque of the photosensitive member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-rays Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-213893, filed on Nov. 14, 2018, which is hereby incorporated by reference herein in its entirety.

What is claimed is:

1. A process cartridge for use in an image forming apparatus, comprising:
   an image bearing member configured to bear a developer image formed by developing an electrostatic latent image with a developer;
   a charging member configured to contact the image bearing member and charge the image bearing member; and
   a cleaning member configured to contact a surface of the image bearing member and clean the surface,
   wherein
   the charging member has an electrically conductive support and an elastic layer which is positioned in contact with the image bearing member;
   the elastic layer includes a semi-conductive rubber or resin composition having a matrix-domain structure including a matrix and domains having electric conductivity; and
   the matrix has a higher volume resistivity than the domain;
   a developer including a toner having toner particles;
   the toner particles each have a surface layer including an organosilicon polymer and being formed from a hydrolysate;
   the organosilicon polymer has a structure represented by a following formula:

$R-SiO_{3/2}$ wherein R represents a hydrocarbon group having at least 1 and not more than 6 carbon atoms; and
   wherein when a ratio of (i) an amount of silicon in the toner particles after washing with an aqueous solution of neutral detergent to (ii) the amount of silicon in the toner particles before the washing with the aqueous solution of neutral detergent is defined as an adhesion ratio, the adhesion ratio of the organosilicon polymer on the surface of each of the toner particles is 90% or more.

2. The process cartridge according to claim 1, further comprising:
a developing member configured to supply the developer to the image bearing member.

3. The process cartridge according to claim 1, wherein the toner has a Martens hardness of at least 200 MPa and not more than 1100 MPa when measured under a maximum load of $2.0 \times 10^{-4}$ N.

4. The process cartridge according to claim 1, wherein the average number of carbon atoms directly bonded to a silicon atom in the organosilicon polymer is at least 1 and not more than 3 per one silicon atom.

5. The process cartridge according to claim 1, wherein each of the domains includes an electrically conductive particle.

6. The process cartridge according to claim 1, wherein a circumferential surface of the elastic layer that is in contact with the image bearing member is configured such that portions made of the domains are scattered on a surface composed of the matrix.

7. An image forming apparatus comprising:
an apparatus main body; and
a process cartridge according to claim 1 that is detachably attachable to the apparatus main body.

* * * * *